US012316636B2

(12) United States Patent
Hillier et al.

(10) Patent No.: US 12,316,636 B2
(45) Date of Patent: May 27, 2025

(54) MANAGEMENT INTERFACE ACCESS IN STORAGE SYSTEMS

(71) Applicant: Hewlett Packard Enterprise Development LP, Houston, TX (US)

(72) Inventors: Christopher Hillier, Fort Collins, CO (US); Curtis C. Ballard, Eaton, CO (US); Luis E. Luciani, Jr., Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 462 days.

(21) Appl. No.: 17/515,685

(22) Filed: Nov. 1, 2021

(65) Prior Publication Data
US 2023/0135502 A1    May 4, 2023

(51) Int. Cl.
*H04L 9/40*         (2022.01)
*H04L 67/1097*   (2022.01)

(52) U.S. Cl.
CPC ........ *H04L 63/101* (2013.01); *H04L 63/0876* (2013.01); *H04L 67/1097* (2013.01)

(58) Field of Classification Search
CPC ............... H04L 63/101; H04L 63/0876; H04L 67/1097
See application file for complete search history.

(56) References Cited

U.S. PATENT DOCUMENTS

| | | | |
|---|---|---|---|
| 7,657,945 B2 * | 2/2010 | Brey ..................... | H04L 9/083 713/165 |
| 10,362,047 B2 | 7/2019 | Lowry et al. | |
| 11,075,754 B2 * | 7/2021 | Brown ................... | G06Q 10/06 |
| 2010/0199276 A1 * | 8/2010 | Umbehocker .......... | G06F 3/067 718/1 |
| 2012/0079567 A1 * | 3/2012 | Van De Groenendaal ................ | H04M 1/72463 726/4 |
| 2016/0308898 A1 | 10/2016 | Teeple et al. | |
| 2017/0329985 A1 | 11/2017 | Barboy et al. | |
| 2018/0359272 A1 | 12/2018 | Mizrachi et al. | |
| 2019/0034623 A1 | 1/2019 | Lowry et al. | |
| 2019/0052636 A1 * | 2/2019 | Wang .................. | H04L 63/0236 |
| 2019/0156039 A1 | 5/2019 | Harsany et al. | |
| 2020/0076819 A1 | 3/2020 | Spurlock et al. | |
| 2020/0137084 A1 | 4/2020 | Roy et al. | |
| 2020/0153863 A1 | 5/2020 | Wiener et al. | |
| 2020/0159624 A1 | 5/2020 | Malkov et al. | |
| 2020/0322286 A1 * | 10/2020 | Mehta ................... | H04L 67/104 |
| 2023/0136843 A1 * | 5/2023 | Talmor .................. | G06F 3/0632 711/154 |

* cited by examiner

*Primary Examiner* — Dhairya A Patel
*Assistant Examiner* — Eui H Kim
(74) *Attorney, Agent, or Firm* — Trop, Pruner & Hu, P.C.

(57) ABSTRACT

Examples described herein relate to configuring access to management interface of a storage system. Examples may obtain network adapter information of the host devices coupled to the storage system using credentials of a management controller of the host devices. Examples may create an allow-list or deny-list containing the network adapter information of the host devices. Examples may allow or deny connections to the management interface from the host devices based on the allow-list or deny-list. Examples may allow dynamic updating of the allow-list and deny-list based on a change in a network adapter of the host device.

17 Claims, 11 Drawing Sheets

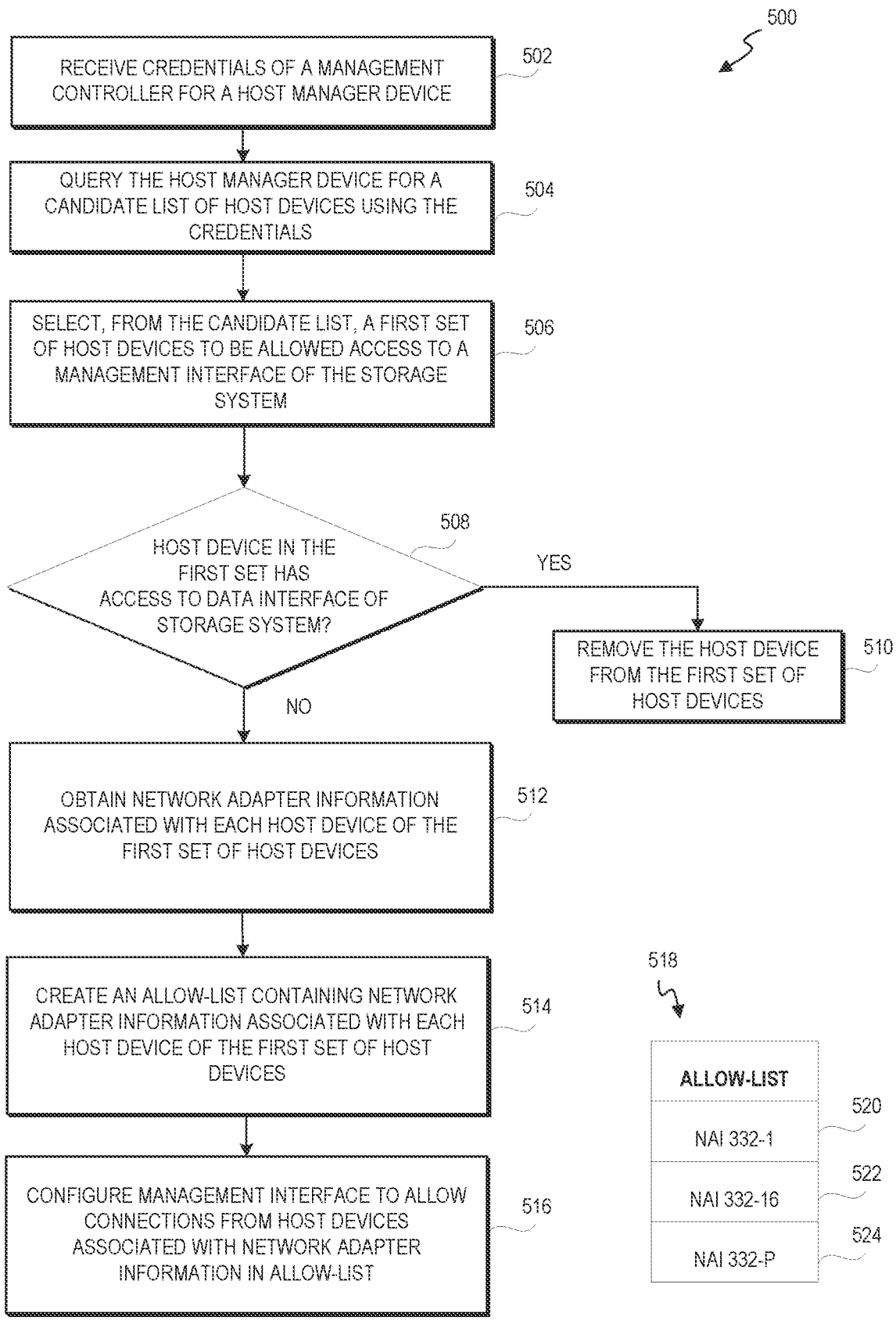

MANAGEMENT INTERFACE ACCESS IN STORAGE SYSTEMS

BACKGROUND

A client computing device, such as a host server or the like, may store data in a storage system, such as a storage array. The client computing device may have multiple network adapters that allow the client computing device to communicate with the storage system. The storage system may provide multiple interfaces to receive commands from such client computing devices. In some examples, the storage system may include a data interface to receive data-access commands (e.g., read/write commands) and a management interface to receive management commands (e.g., administrative commands) from the client computing device.

BRIEF DESCRIPTION OF THE DRAWINGS

The following detailed description references the drawings, wherein:

FIG. 5A is a flowchart of an example method to configure management interface of a storage system to allow connections from host devices;

FIG. 5B is an example allow-list that includes network adapter information of host devices that are allowed to access the management interface;

DETAILED DESCRIPTION

Figure 1:
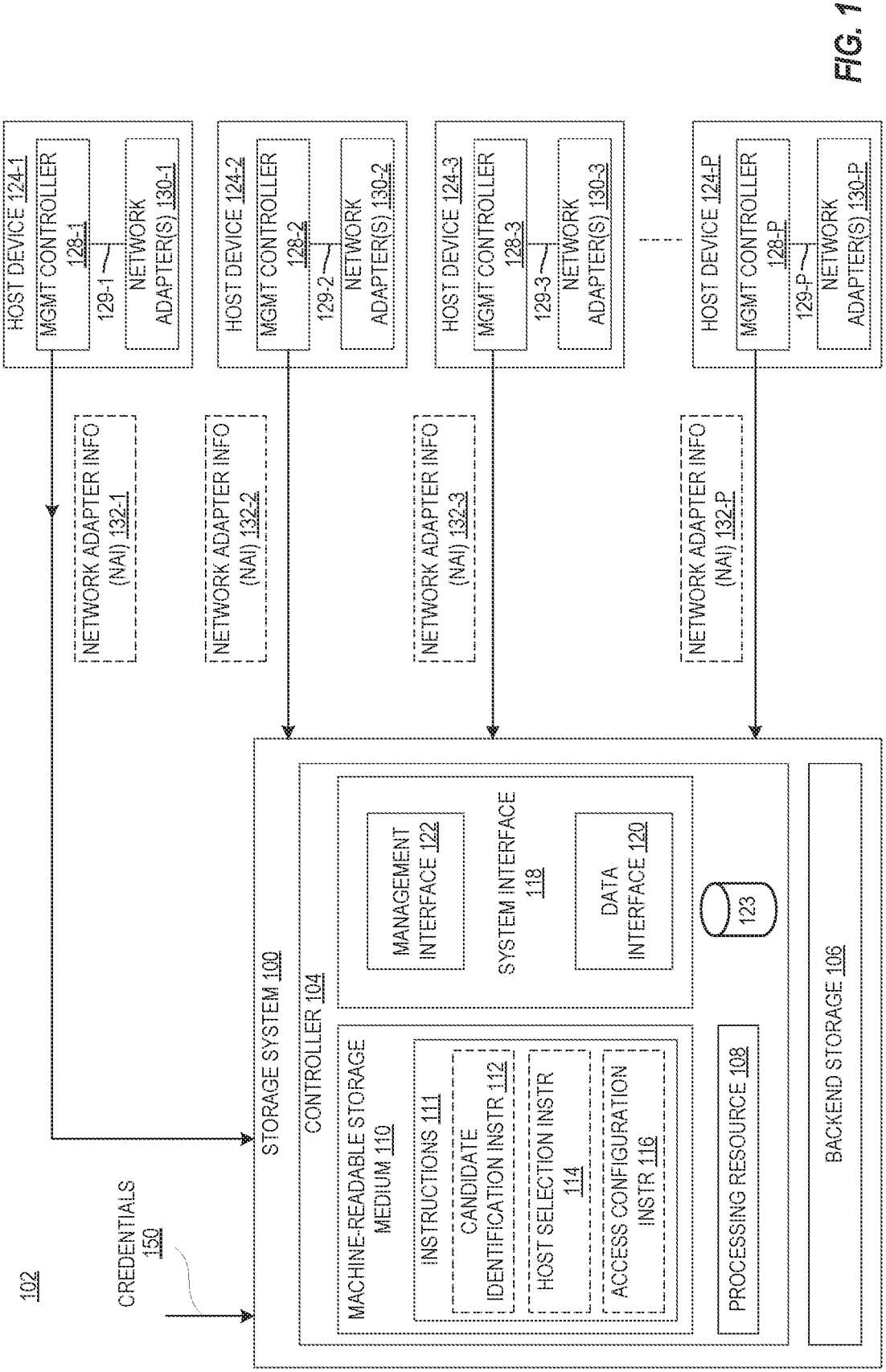
FIG. 1 is a block diagram of a networked system that allows configuration of management interface access in a storage system, in accordance with an example.

A storage system (e.g., a storage array) provides multiple interfaces to client computing devices (referred to herein as host devices) to store or manage data in the storage system. For example, a storage system may include a data interface that allows data-access operations (e.g., read/write operations). A host device, connected to the data interface, may send data-access commands (read/write commands) to and receive responses to the data-access commands from the storage system. The data interface may be supported by various protocols, such as Small Computer System Interface (SCSI), Non-Volatile Memory Express (NVMe), or the like.

The storage system may also include a management interface, separate from the data interface, that allows management operations, such as configuring logical disks, initializing or reinitializing logical disks, setting system configuration, or the like. The management interface may provide a graphical user interface supporting management applications, which may allow users (e.g., storage administrators) to configure and maintain the storage systems remotely. For example, a storage administrator may use a host device that is allowed to connect to the management interface for sending management commands to and receiving responses to the management commands from the storage system.

The data interface may provide a high performance interface (e.g., with higher bandwidth) to facilitate transfer of a large amount of data during data-access operations. The management interface may not provide high performance and typically, a limited number of storage administrators may be authorized to access the management interface. The storage administrators may use credentials (e.g., username and password) to log in to host devices that are allowed to connect to the management interface of the storage system. Generally, the host devices used by the storage administrators to communicate administrative or management commands to the storage system may be different from host devices used to communicate data-access commands. For example, a storage system may allow a host device used by a storage administrator to access the management interface of the storage system, while a host device not used by the storage administrator may not use or have access to the management interface.

In some examples, the storage system may allow a host device to connect to both the data interface and the management interface of the storage system. Such a host device may send data-access commands via the data interface and may also send management commands via the management interface of the storage system. However, a host device that has access to both the data interface and the management interface may be disadvantageous in some examples. For example, if the host device is targeted by malware, such as in a ransomware attack, then the malware may gain access to the management interface of the storage system from the host device and affect the availability of the storage system, while also encrypting data stored on the storage system through the data interface. Further, the malware may also send requests from the host device to the storage system to delete backup data received from the storage system or other host devices.

Some examples may address issues noted above by restricting the number of host devices allowed to access the management interface. For example, storage administrators may be provided a dedicated host device to connect to the management interface of the storage system. Further, host devices that primarily send data-access commands may be allowed to connect to the data interface but may not be allowed to connect to the management interface. In such examples, the storage system may maintain identities of host devices (e.g., host server name or Internet Protocol (IP) address) that are to be allowed or denied access to the management interface.

However, configuring access to the management interface of the storage system using identity information of host devices may also be disadvantageous. For example, such a configuration may be problematic if the identities of the host devices can be spoofed (e.g., by malware). Further, a large number of host devices may be coupled to the storage system, and manually providing the identity information of each host device, which is to be allowed or denied access to the management interface may be tedious and labor-intensive. In some examples, the identity information of the host devices may change over a period of time. For example, a host device may undergo identity changes (e.g., dynamic host configuration protocol (DHCP) change or host server name change), configuration changes (software or firmware update), or the like. In such examples, manually tracking changes in the host devices and updating the identity information in the storage system as a result of such changes may be onerous and time-consuming.

To address the issues, examples described herein may reduce the number of host devices allowed to access the management interface of a storage system. Examples described herein may obtain network adapter information of each host device coupled to the storage system using credentials of a management controller of that host device. In such examples, the storage system may create an allow-list or deny-list containing the network adapter information of host devices and allow or deny connections to the management interface from the host devices based on the allow-list or deny-list. Examples may configure the management interface of the storage system with the network adapter information to allow or deny connections from the host devices. The network adapter information of a host device may include cryptographic identity information (e.g., a digital signature, a digital certificate, etc.) of a network adapter of that host device. The cryptographic identity information may uniquely identify the network adapter or the host device including the network adapter and may provide a secure mechanism to manage the storage system as such information may be hard to spoof (e.g., by malware). In this manner, examples may obtain network adapter information of host device(s) from the management controller of each host device to restrict access to the management interface of the storage system.

Examples described herein may also allow dynamically updating the allow-list and deny-list. The management controller of a host device may detect a change in a network adapter of the host device and provide a notification indicative of a change in the associated network adapter information to the storage system. The storage system may update the allow-list or deny-list to restrict access to its management interface. In this manner, examples may reduce manual intervention (e.g., by a storage administrator) for monitoring network adapter changes and updating the allow-list and deny-list.

FIG. 1 is a block diagram of an example network 102 to configure access to a management interface of a computing system. In examples described herein, a computing system may be implemented by any suitable combination of hardware and software (e.g., machine-readable, instructions executable by a processing resource). For example, in examples described herein, a computing system (such as storage system 100) may be implemented as a computing device (e.g., storage array, a backup appliance, a server, a hyperconverged system, or the like), or a plurality of computing devices. In the example of FIG. 1, storage system 100 (also referred to herein as "system 100") may be a storage array comprising a controller 104 and a backend storage 106 that may be physically accessible by the controller 104.

The controller 104 may include at least one processing resource 108 and at least one machine-readable storage medium 110 comprising (e.g., encoded with) at least storage instructions 111 that are executable by the at least one processing resource 108 to implement functionalities described herein in relation to instructions 111. Instructions 111 may include at least instructions 112, 114, and 116, which may be executable by the processing resource 108. In some examples, the controller 104 may include a persistent repository 123 for storing information (e.g., information obtained from host devices). The persistent repository 123 may be implemented by any suitable type of non-volatile storage (e.g., a solid-state storage (SSD) device(s), such as flash device(s), or a hard disk drive(s) (HDDs), or the like).

The controller 104 may provide a system interface 118 to remote devices connected to the storage system 100. In the example of FIG. 1, the system interface 118 includes a data interface 120 and a management interface 122. The data interface 120 may provide access to one or more storage volume(s) stored on the backend storage 106, for example. A storage volume may be a collection of volumes of data (e.g., "virtual volumes", Logical Unit Numbers ("LUNs"), or the like). Each storage volume may include a virtual address space backed by physical storage devices in the backend storage 106, such that, when data is stored to the storage volume, the data may be stored to the storage devices (e.g., when flushed from cache, etc.). Each of the physical storage devices of the backend storage 106 may be a non-volatile storage device, such as an HDD, an SSD, or the like, and the backend storage 106 may include any combination of such non-volatile storage devices. The management interface 122 may provide an interface (e.g., a graphical user interface) supporting management applications, which may allow users (e.g., storage administrators) to manage the storage system 100 from remote devices.

The controller 104 may receive data-access commands or IO (input/output) commands (e.g., read/write commands) from a plurality of devices, such as host devices 124-1 through 124-P (where "P" is an integer greater than or equal to 3) over a communication medium. Examples of such communication medium may include Fibre Channel, Ethernet, and other storage area networks, local area networks, or the like. The controller 104 may receive the 10 commands through the data interface 120, process the 10 commands, and perform corresponding 10 operations (e.g., read/write operations) at the backend storage 106 in order to execute the received commands. In parallel with processing 10 commands, the controller 104 may receive management commands from one or more of the host devices 124-1 to 124-P through the management interface 122. The management commands may include administrative instructions provided by a storage administrator to manage the various functions performed by the system 100. The management commands may include instructions to configure storage volumes, initializing or reinitializing logical disks, requesting current values, and setting values of various operational and control parameters of the system, or the like.

The host devices 124-1 to 124-P may include hardware components (such as processing, memory, and network resources) for executing applications and communicating with other devices. In some examples, one or more of the host devices among the host devices 124-1 to 124-P may be computing devices, such as servers, that provide services to clients (not shown in FIG. 1) using the data stored at the backend storage 106 of system 100. In such examples, the one or more host device(s) may execute one or more host application(s), which send IO commands to the data interface 120 of the storage system 100 for performing IO operations (e.g., read/write operations) on the data stored in the backend storage 106. In some examples, one or more of the host device(s) among the host devices 124-1 to 124-P may be capable of managing the storage system 100. In such examples, a host device may be operated by a storage administrator to manage the storage system 100. The storage administrator may perform administrative operations for managing storage system 100.

In examples described herein, each host device may include a management controller and a network adapter. The management controller may include a dedicated processing resource that receives information associated with the physical state of the hardware (e.g., network adapters, etc.) on the host devices using sensors, busses, etc. In the example of FIG. 1, the host devices 124-1 to 124-P may include respective management controllers 128-1 to 128-P that are connected to various components of the associated host device (e.g., via serial busses 129-1 to 129-P). The management controllers 128-1 to 128-P may be capable of querying identity and information associated with the components in the respective host devices 124-1 to 124-P. In some examples, each of the management controllers 128-1 to 128-P may be a baseboard management controller (BMC), which may track, store, and provide physical state of the respective host devices 124-1 to 124-P to the storage system 100, for example.

In the example of FIG. 1, the host devices 124-1 to 124-P include respective network adapters 130-1 to 130-P (e.g., network interface cards), which may be devices that include hardware and/or software components that allow transmission of data from one form to another. A network adapter may be compatible with a protocol used by the network (e.g., storage area network) over which communication between a host device and storage system is performed. In other words, the network adapter may convert signals sent internally in the host device into a form that may be sent over the desired network. Additionally, the network adapter may convert signals received by the host device into a form that may be communicated internally through the host device.

The management controllers 128-1 to 128-P may monitor and retrieve respective network adapter information 132-1 to 132-P of each of the host devices 124-1 to 124-P. The network adapter information of a host device may include hardware information, software information, firmware information associated with a network adapter of that host device. In some examples, the network adapter information of a host device may include cryptographic identity information of a network adapter of that host device or the host device itself. The cryptographic identity information may uniquely identify the network adapter or the host device including the network adapter using digital certificates, digital signatures, or the like.

In some examples, each of the host devices 124-1 to 124-P may obtain a digital certificate from a trusted entity, such as a certificate authority (not shown in FIG. 1). For example, a host device may provide identity information, which may include hardware information, software information, firmware information, or the like, associated with the network adapter of that host device to the certificate authority. In some examples, the host device may also provide a hash value of the hardware information, software information, firmware information, or the like. The certificate authority may determine whether the identity information is authentic (e.g., via standard validation techniques). Upon successful authentication, the certificate authority may issue a digital certificate, which may be an electronic file (e.g., a document) in an X.509 standard format, that certifies that the hardware information, the software information, the firmware information associated with the network adapter of that host device belong to the host device. In some examples, the digital certificate may include a digital signature from the certificate authority (e.g., generated using a private key belonging to the certificate authority) that indicates that the digital certificate and contents included in the digital certificate are authentic and valid.

Although, for illustrative purposes, FIG. 1 shows a single storage system and a limited number of host devices and their components, the network 102 may include any suitable number of storage systems and any suitable number of host devices.

Figure 2:
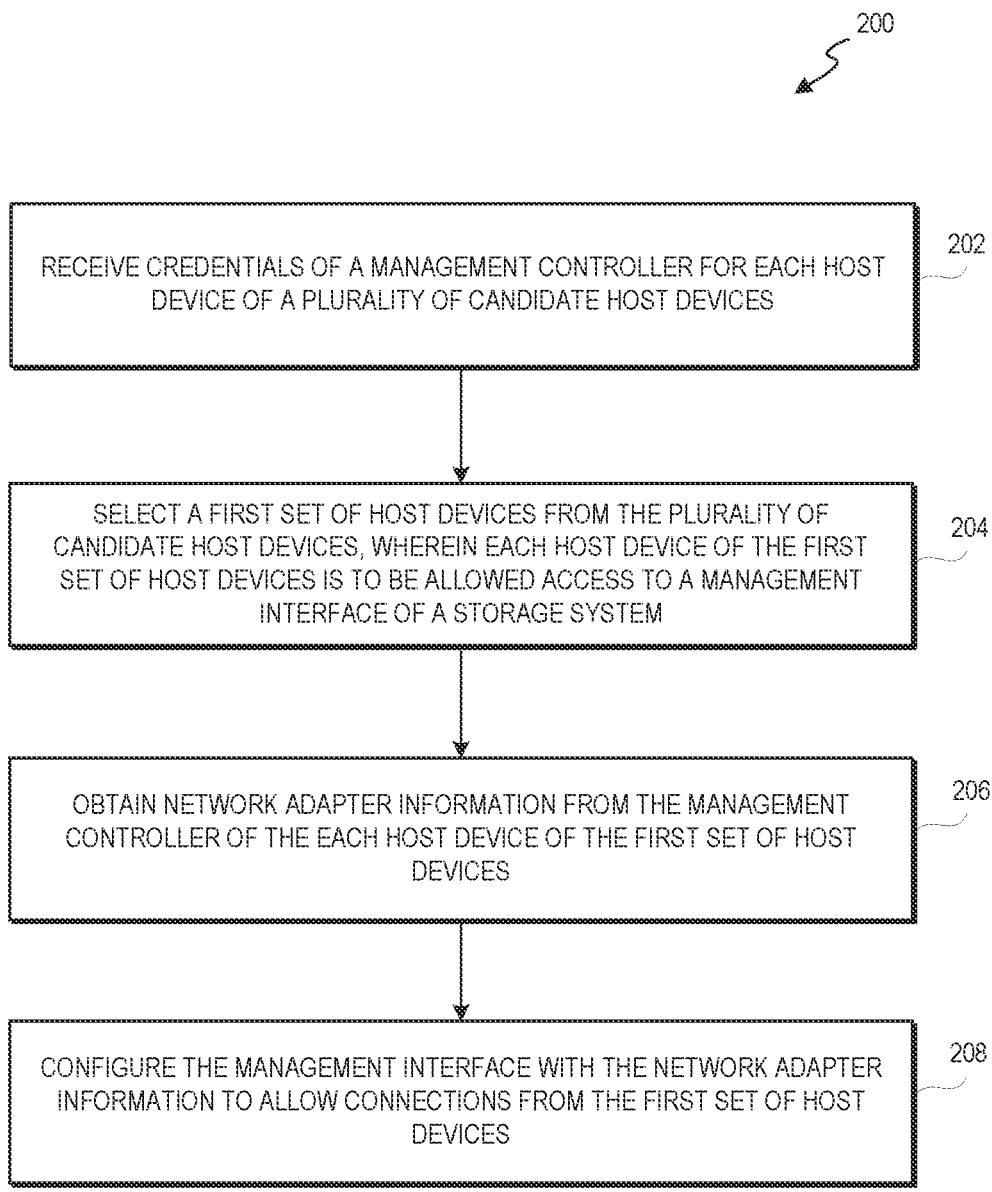
FIG. 2 is a flowchart of an example method to configure management interface access in a storage system.

Examples will now be described herein in relation to FIGS. 1 and 2, where FIG. 2 is a flowchart of an example method 200 to configure management interface access of a storage system. Although execution of method 200 is described below with reference to the storage system 100 of FIG. 1, other computing devices suitable for the execution of method 200 may be utilized. Additionally, implementation of method 200 is not limited to such examples. Although the flowchart of FIG. 2 shows a specific order of performance of certain functionalities, method 200 is not limited to that order. For example, the functionalities shown in succession in the flowchart may be performed in a different order, may be executed concurrently or with partial concurrence, or a combination thereof.

At 202 of method 200, candidate identification instructions 112 (e.g., when executed by the processing resource 108) may receive credentials of the management controllers for each host device of a plurality of candidate host devices. A candidate host device may refer to a host device from the host devices 124-1 to 124-P connected to the system 100 that may potentially be allowed or denied access to the management interface 122 of the system 100. In some examples, the system 100 may receive the credentials 150 as a user input (e.g., from a storage administrator). For example, the storage system 100 may include a user interface (GUI of the storage system) to receive the credentials 150 from a storage administrator. In some examples, the credentials may include authentication information (e.g., security key or password) associated with the management controller of a host device. The system 100 may verify whether the credentials 150 are valid and provide a list of candidate host devices for selection. In some examples, the system 100 may receive the credentials 150 and determine whether the credentials 150 matches with credentials stored in a database. The database may be a local database (e.g., the persistent repository 123) or a remote database that stores passwords, security keys, usernames, hash values, or the like. In response to a successful verification, the system 100 may provide a list of candidate host devices for selection (e.g., via the GUI), for example.

At 204, host selection instructions 114 may select a first set of host devices from the candidate host devices. The first set of host devices may include host devices that are to be allowed access to the management interface 122 of the system 100. In some examples, the system 100 may receive user inputs to select the first set of host devices from the candidate host devices. For example, a storage administrator may provide the user inputs (e.g., via GUI or from a host device over a network) to select one or more host device(s) from the candidate host devices. In some examples, instructions 114 may identify host devices from the candidate host devices that already have access to the management interface 122 but not to the data interface 120 and include such host devices in the first set of host devices. For example, instructions 114 may perform a look-up operation in the persistent repository 123, which may store a list of host devices (or network adapters of the host devices) that already have access to the management interface 122 but not to the data interface 120. Based on the look-up operation, instructions 114 may identify the host devices that have exclusive access to the management interface 122 and include such host devices in the first set of host devices.

At 206, access configuration instructions 116 may obtain network adapter information associated with each host device of the first set of host devices from the respective management controllers of each host device. In some examples, instructions 116 may send a request to each host device of the first set of host devices for network adapter information associated with such host devices. The instructions 116 may send the request via an application programming interface (API) and may include commands indicating the identities of such host devices, for example. In response to the request, each of the first set of host devices may provide the network adapter information to the system 100. In some examples, instructions 116 may obtain the network adapter information from the respective host devices (e.g., via an API response).

In some examples, the network adapter information of a host device may include one or more of a digital certificate, a digital signature, or the like. The digital certificate may include identity information of the host device and its network adapter that is verified by a trusted certificate authority. As described earlier, the digital certificate may include a digital signature from the certificate authority that indicates that the digital certificate and its contents are valid. In some examples, the digital signature may be created by encrypting a hash value of the hardware, firmware, software information of the network adapter of the host device using a private key (e.g., of the certificate authority), used to validate the network adapter information.

Each host device of the first set of host devices may provide the respective digital certificate, the hardware, firmware, software information of the respective network adapters and their respective encrypted hash value (i.e., the digital signature) to the system 100. In some examples, the system 100 may determine whether the received network adapter information of each host device of the first set of host devices is valid. For example, the system 100 may check whether the network adapter information includes a digital certificate and whether the digital certificate is issued by a trusted certificate authority (e.g., based on the digital signature from the certificate authority in the digital certificate). In some examples, the system 100 may use the public key of the certificate authority to decrypt the encrypted hash value (digital signature) to obtain the hash value of the hardware, firmware, software information of the network adapter of each host device. The system 100 may determine whether the decrypted hash value matches with the hash value of the hardware, firmware, software information of the network adapter of each host device. Upon a successful match, the system 100 may successfully validate the network adapter information.

At 208, access configuration instructions 116 may configure the management interface 122 with the obtained network adapter information to allow connections from the first set of host devices. In some examples, the instructions 116 may store the obtained network adapter information in the persistent repository 123. The persistent repository 123 may include one or more list(s) (e.g., tables) that indicate the network adapter information of the host devices that are allowed to access the management interface 122. In response to receiving a request to access the management interface 122 from a host device, the instructions 116 may determine whether the network adapter information of that host device is stored in the persistent repository 123. In response to determining that the network adapter information is indicated in the list, the instructions 116 may allow access to the management interface 122. In response to determining that the network adapter information is not indicated in the list, the instructions 116 may deny access to the management interface 122. In other examples, the persistent repository 123 may include one or more list(s) that indicate network adapter information of host devices that are denied access to the management interface 122.

Figure 3:
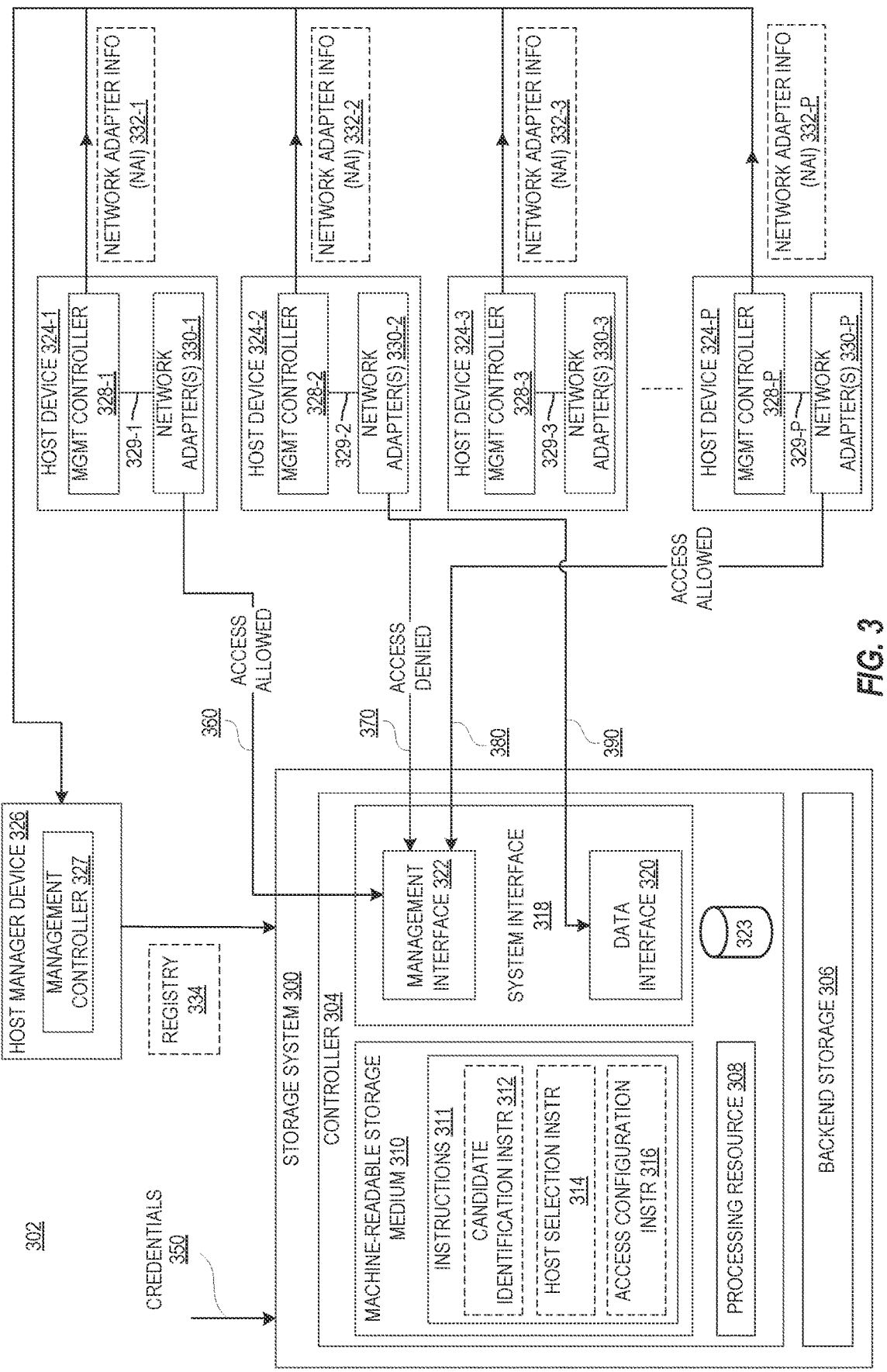
FIG. 3 is a block diagram of a networked system that allows configuration of management interface access in a storage system, in accordance with another example.

FIG. 3 is a block diagram of an example network 302 to configure access to a management interface of a storage system 300 (referred to herein as a "storage system 300" or "system 300"). The storage system 300 may include a controller 304 and backend storage 306 that may be analogous to the controller 104 and the backend storage 106 of system 100 of FIG. 1. The controller 304 may include a processing resource 308, a machine-readable storage medium 310, a system interface 318 including a management interface 322 and a data interface 320, and a persistent repository 323. The machine-readable storage medium 310 may store (e.g., encoded with) instructions 311 that includes candidate identification instructions 312, host selection instructions 314, and access configuration instructions 316.

In the example of FIG. 3, the system 300 is connected to a host manager device 326, which may manage the host devices 324-1 to 324-P. In such examples, the host manager device 326 may aggregate information from the host devices 324-1 to 324-P (e.g., periodically) and provide the information to the storage system 300. For example, the host manager device 326 may query the management controller 328-1 to 328-P on each host device 324-1 to 324-P to determine whether the host devices 324-1 to 324-P includes a network adapter that supports (e.g., is compatible with) a protocol used by the system 300. In response to determining that a network adapter supports the protocol used by the system 300, the host manager device 326 may also obtain other information (e.g., by a polling process) from each of the host devices 324-1 to 324-P. In the example of FIG. 3, the information may be respective network adapter information 332-1 to 332-P that may include a digital certificate, cryptographic identity information of respective network adapters 330-1 to 330-P, and hardware information, software information, firmware information, or the like, associated with the respective network adapters 330-1 to 330-P.

Examples of hardware information may include, but not limited to, Media Access Control (MAC) address of logical or physical ports of the host devices, world-wide Name (WWN) or world-wide port name (WWPN) associated with host devices, physical address assigned to interfaces (e.g., Ethernet interface, network interface cards, host bus adapters, or the like). Examples of firmware information and software information may include, but not limited to, information related to boot images, operating system images, firmware version, firmware author, or the like. The network adapter information 332-1 to 332-P may also include vendor information and/or model information. The model information may include model number, name, type, or other characteristics of a hardware or software component in the host device. The vendor information may include information related to components provided by a vendor or original equipment manufacturer (OEM).

In various examples, the network adapter information may include a digital certificate, a digital signature, or the like, to validate the identity of a component (i.e., a network adapter) or the host device itself and to verify the integrity of information associated with the network adapter and host device (e.g., using a digital signature). The digital certificate may be issued by a trusted entity (e.g., a certificate authority) that provides a guarantee that the identity of network adapters and network adapter information is genuine and valid. In some examples, to obtain a digital certificate, the host device may provide hardware information, software information, firmware information, or the like, associated with the network adapter of the host device to a certificate authority. For example, the host device may provide MAC address, WWN, WWPN, etc., and their hash value to the certificate authority. The certificate authority may create a digital signature by encrypting the hash value of the MAC address, WWN, WWPN, etc., using a private key of the certificate authority. The certificate authority may provide the digital signature, the digital certificate, and the network adapter information to the host device. The host device may provide the digital certificate with the digital signature to the system 300 either directly or via the host manager device 326. The system 300 may validate the digital certificate (e.g., based on the digital signature from the certificate authority in the digital certificate) and decrypt the digital signature using a public key of the certificate authority to ensure that the network adapter information has not been spoofed, corrupted, or tampered with by a third-party (e.g., malware) after issuance of the digital certificate.

In some examples, the host manager device 326 may be capable of storing the network adapter information (e.g., in a memory or storage resource) and may provide the information to a computing system (e.g., system 300) when requested. For example, the system 300 may store such information in the persistent repository 323. The host manager device 326 may also include a registry 334 of host devices 324-1 to 324-P. The registry 334 may include one or more candidate list(s) of host devices, where each candidate list includes identities of host devices having similar privileges to access the system interface 318 of system 300. For example, the registry 334 may include one or more of a first candidate list of host devices that have access to the data interface, a second candidate list of host devices that have access to the management interface, a third candidate list of host devices that have access to the data interface and the management interface, or the like.

Although, for illustrative purposes, FIG. 3 shows a single storage system, a single host manager device, and a limited number of host devices and their components, the network 302 may include any suitable number of storage systems and any suitable number of host devices.

Figure 4:
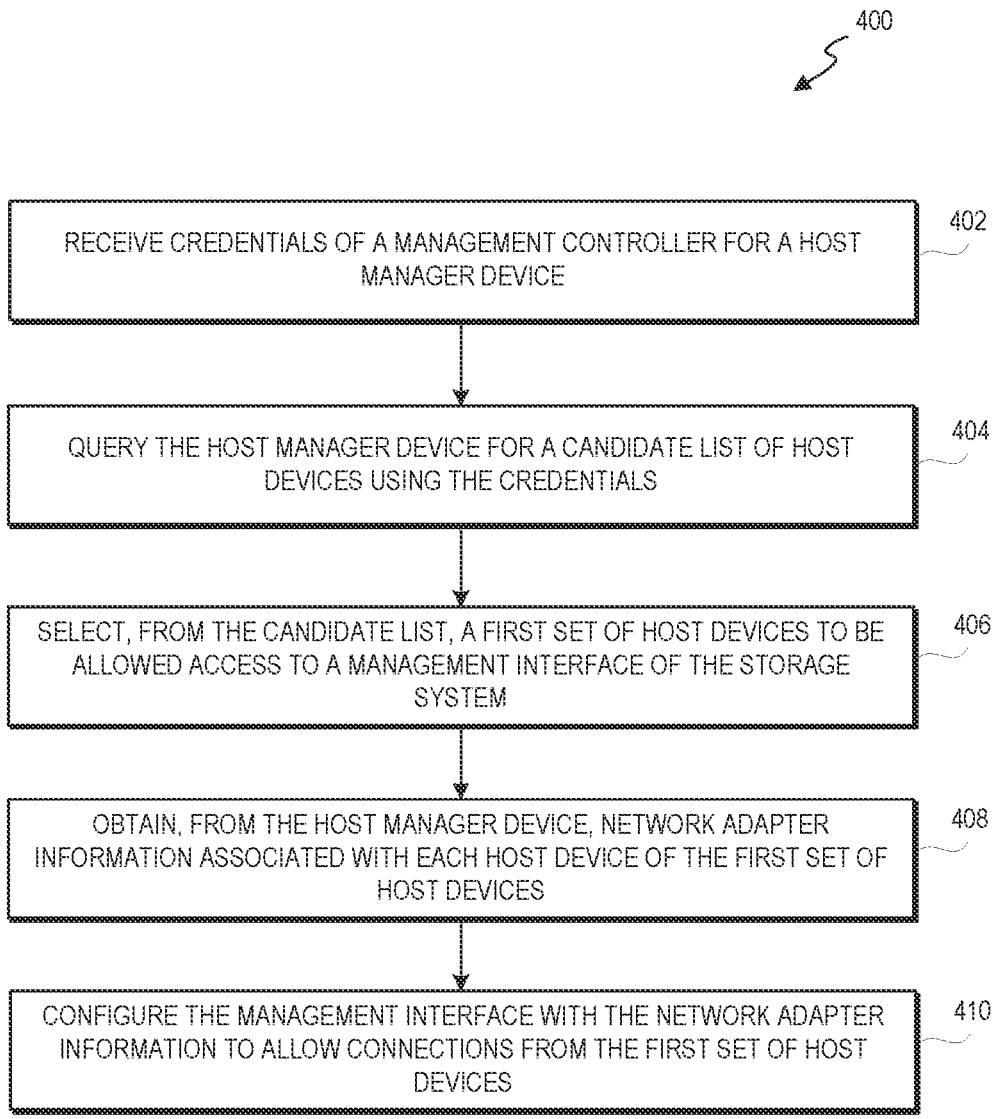
FIG. 4 is a flowchart of another example method to configure management interface access in a storage system.

Examples will now be described herein in relation to FIGS. 3 and 4, where FIG. 4 is a flowchart of an example method 400 that includes configuration of a management interface of a storage system. Although execution of method 400 is described below with reference to the storage system 300 of FIG. 3, other computing devices suitable for the execution of method 400 may be utilized. Additionally, implementation of method 400 is not limited to such examples. Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof.

At 402 of method 400, candidate identification instructions 312 (e.g., when executed by at least one processing resource 308) may receive credentials of a management controller 327 of a host manager device 326. In some examples, the storage system 300 may receive the credentials 350 as a user input (e.g., from a storage administrator). For example, the storage system 300 may include a user interface to receive the credentials 350 from a storage administrator. In some examples, the credentials may include authentication information (e.g., security key or password) associated with the management controller 327 of a host manager device 326. The host manager device 326 may verify whether the credentials 350 are valid. For example, the host manager device 326 may receive the credentials 350 (or a hash value of the credentials 350) from the system 300. The host manager device 326 may determine whether the credentials 350 or the hash value thereof matches with credentials or a hash value stored in a database. The database may be a local or remote database configured to store passwords, security keys, usernames, or hash values. In response to a successful verification, the host manager device 326 may provide an acknowledgment to the storage system 300, for example. Further, the host manager device 326 may allow access to the registry 334 containing the one or more candidate list(s) of host devices.

At 404, instructions 312 may query the host manager device 326 for a candidate list of host devices among the host devices 324-1 to 324-P. In some examples, the query may indicate to the host manager device 326 to provide a candidate list of host devices that already have access to the management interface 322 of the system 300. In response to the query, the host manager device 326 may provide the registry 334 containing the candidate list of host devices that have access to the management interface 322. In other examples, the host manager device 326 may provide a registry 334 containing one or more candidate list(s) of host devices that have access to the management interface and the data interface of the system 300.

At 406, host selection instructions 314 may select a first set of host devices from the candidate list. The first set of host devices may include host devices that are to be allowed access to the management interface 322 of the system 300. In some examples, the system 300 may receive a user input to select the first set of host devices from the candidate list. For example, a storage administrator may provide inputs (e.g., via a GUI or from a host device) to select one or more host device(s) from the candidate list. In some examples, instructions 314 may identify host devices from the candidate list that already have access to the management interface 322 but not to the data interface 320 and include such host devices in the first set of host devices.

At 408, access configuration instructions 316 may obtain network adapter information associated with each host device of the selected first set of host devices from the host manager device 326. In some examples, instructions 316 may send a request to the host manager device 326 to provide the network adapter information associated with the host devices of the first set of host devices. The request may include the commands indicating the identities of such host devices, for example. In response to the request, the host manager device 326 may provide the network adapter information stored in a storage or memory resource (not shown in FIG. 3) of the host manager device 326. In some examples, instructions 316 may obtain the network adapter information directly from the respective host devices (e.g., via an application programming interface).

As described earlier, the network adapter information of a host device may include one or more of a digital certificate, a digital signature, or the like. Each host device of the first set of host devices may provide the respective digital certificate, the hardware, firmware, software information of the respective network adapters and their respective encrypted hash value (i.e., digital signature) as respective network adapter information to the system 300. The system 300 may determine whether the received network adapter information of each host device of the first set of host devices is valid. For example, the system 300 may check whether the network adapter information includes a digital certificate and whether the digital certificate is issued by a trusted certificate authority (e.g., based on the digital signature from the certificate authority in the digital certificate). In some examples, the system 300 may perform an additional validation check of network adapter information. For example, the system 300 may decrypt the encrypted hash value using the public key of the certificate authority to obtain the hash value of the hardware, firmware, software information of the network adapter of each host device. The system 300 may determine whether the decrypted hash value matches with a hash value of the hardware, firmware, software information of the network adapter of each host device. Upon a successful match, the system 300 may successfully validate the network adapter information.

At 410, instructions 316 may configure the management interface with the obtained network adapter information to allow connections from the first set of host devices. In some examples, the instructions 316 may store the obtained network adapter information in a persistent repository 323. The persistent repository 323 may include one or more list(s) (e.g., tables) that indicate the network adapter information of the host devices that are allowed to access the management interface 322. In response to receiving a request to access the management interface 322 from a host device, the instructions 316 may determine whether the network adapter information of that host device is stored in the persistent repository 323. In response to determining that the network adapter information is indicated in the list, the instructions 316 may allow access to the management interface 322. In response to determining that the network adapter information is not indicated in the list, the instructions 316 may deny access to the management interface 322.

Examples will now be described herein in relation to FIGS. 3, 5A, and 5B. FIG. 5A is a flowchart of an example method 500 to configure management interface of a storage system to allow connections from host devices. At 502 of method 500, instructions 312 may receive credentials of a management controller for a host manager device. In some examples, a storage administrator (or any user) may send the credentials from a remote device coupled to the storage system 300. For example, a storage administrator may operate one of the host devices 324-1 to 324-P to configure access to the management interface of the storage system 300. In some examples, instructions 312 may receive credentials of management controllers of the host devices instead of the host manager device. For example, a storage administrator may provide credentials of candidate host devices that may be potentially allowed to access the management interface 322.

At 504, instructions 312 may query the host manager device 326 for a candidate list of host devices using the credentials. The host manager device 326 may maintain one or more registries of host device(s) selected from the host devices 324-1 to 324-P. For example, the host manager device 326 may maintain a first registry of host devices that have access to the management interface 322 of the system 300 and a second registry of host devices that have access to the data interface 320 of the system 300. In response to the query, the host manager device 326 may send the first registry to the system 300. On receiving the candidate list of host devices, at 506, instructions 314 may select a first set of host devices from the candidate list. In the example where the administrator provides the credentials of candidate host devices, instructions 314 may select a first set of host devices from the candidate host devices. The first set of host devices may be the host device(s) to be allowed access to the management interface 322 of the system 300. Instructions 314 may select the first set of host devices based on an input provided by a storage administrator, for example.

At 508, instructions 314 may determine whether a host device in the first set of host devices has access to the data interface 320 of the storage system 300. In response to determining that a host device in the first set of host devices has access to the data interface 320 of the system 300 ("YES" at 508), the method 500 may proceed to 510. At 510, instructions 314 may remove the host device from the first set of host devices. The storage system 300 may prevent host devices that have access to the data interface 320 from accessing the management interface 322. As a result, the storage system 300 may restrict the number of host devices that can access the management interface 322 and reduce the attack surface of the storage system 300.

In response to determining that the host device in the first set of host devices does not have access to the data interface 320 ("NO" at 508), the method 500 may proceed to 512. At 512, instructions 316 may obtain network adapter information associated with the host device from the host manager device. For example, instructions 316 may send a request for network adapter information to the host manager device 326. In some examples, in response to the request, the host manager device 326 may provide the network adapter information stored in a memory resource of the host manager device 326. In other examples, in response to the request, instructions 316 may directly retrieve the network adapter information from the respective management controllers of the host devices of the first set of host devices in real-time. For example, instructions 316 may obtain the network adapter information from the respective host devices (e.g., via an API).

At 514, instructions 316 may create an allow-list containing the network adapter information associated with each host device of the first set of host devices. The allow-list may be stored in the persistent repository 323 of system 300. In some examples, instructions 316 may add the obtained network adapter information to an existing allow-list in the persistent repository 323. In some examples, instructions 316 may determine whether the network adapter information includes a cryptographic identity information (such as digital certificate, digital signature, or the like) before creating the allow-list or adding the network adapter information to an existing allow-list. The digital certificate may be issued by a trusted certificate authority to authenticate an identity of the network adapter or a host device and to verify integrity of the network adapter information of the host device. Instructions 316 may authenticate and verify by checking whether the digital certificate includes a digital signature from the trusted certificate authority, for example. FIG. 5B depicts an example allow-list 518 including example entries 520, 522, 524. Entry 520 includes network adapter information (NAI) 332-1 corresponding to host device 324-1, entry 522 includes NAI-332-16 corresponding a host device among the host devices 324-1 to 324-P, entry 524 includes NAI-332-P corresponding to host device 324-P. Although a single allow-list and three entries are depicted, instructions may create multiple allow-lists, each having a plurality of entries.

At 516, instructions 316 may configure the management interface 322 to allow connections from host devices associated with network adapter information in the allow-list. For example, in response to receiving a request to access the management interface 322 from a host device, instructions 316 may determine whether the network adapter information of that host device is indicated in the allow-list. If network adapter information is indicated in the allow-list, instructions 316 may allow access to the management interface 322. For example, the host device 324-1 and 324-P may be allowed access to the management interface 322 (as depicted by the arrows 360 and 380 in FIG. 3) as network adapter information 332-1 and 332-P is indicated in the allow-list. In response to determining that the network adapter information is not indicated in the allow-list, the instructions 316 may deny access to the management interface 322. For example, the host device 324-3 may be denied access to the management interface 322 as network adapter information 332-3 is not indicated in the allow-list (as depicted by the arrows 370 in FIG. 3).

Figure 6A:
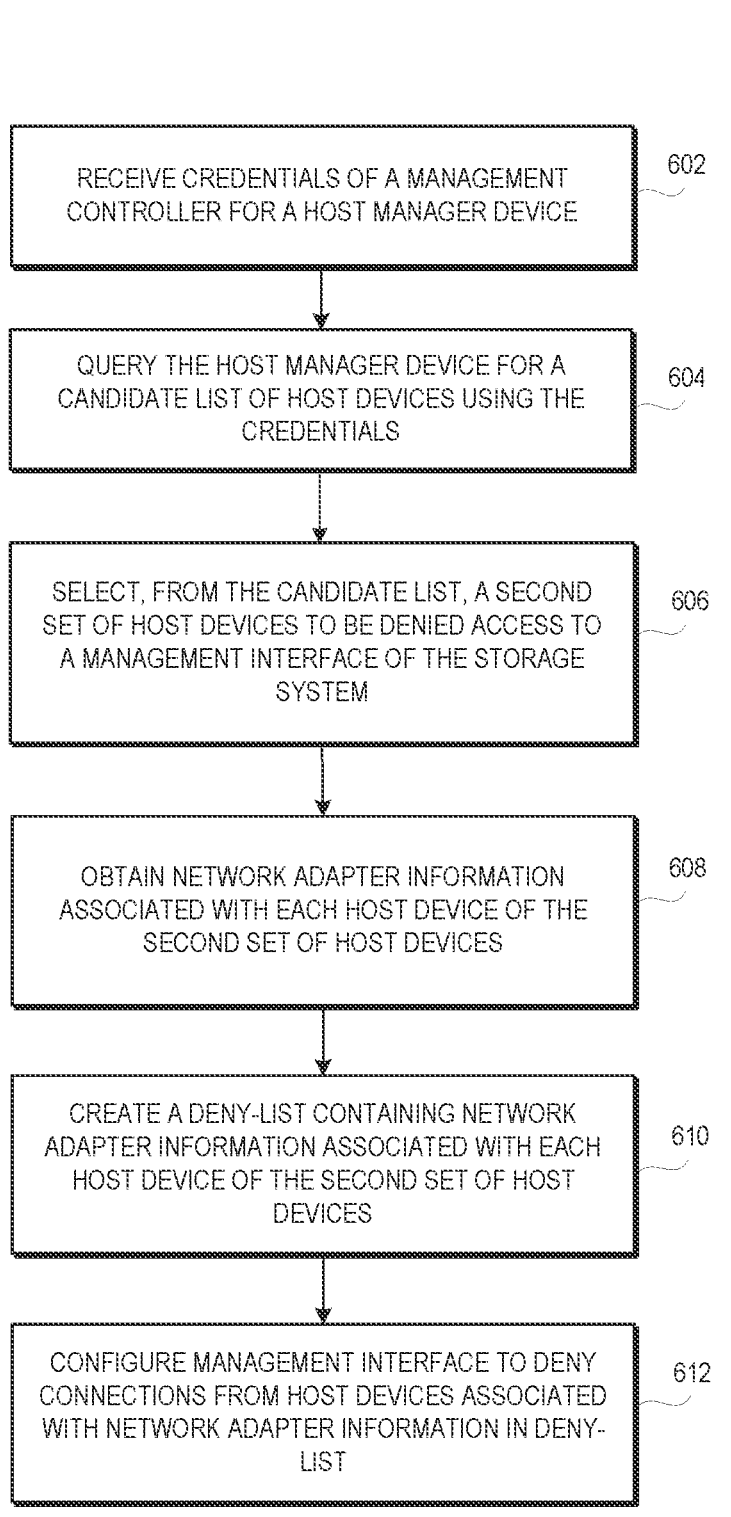
FIG. 6A is a flowchart of an example method to configure management interface of a storage system to deny connections from host devices.
Figure 6B:
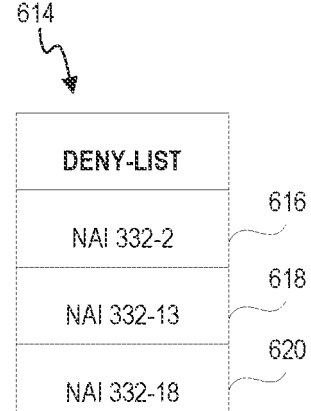
FIG. 6B is an example deny-list that includes network adapter information of host devices that are denied access to the management interface.

Examples will now be described herein in relation to FIGS. 1, 6A, and 6B. FIG. 6A is a flowchart of an example method 600 to configure management interface of a storage system to deny connections from host devices. At 602 of method 600, instructions 312 may receive credentials of a management controller for a host manager device. In some examples, instructions 312 may receive credentials of the management controllers of the host devices instead of the host manager device. For example, a storage administrator may provide credentials of a list of candidate host devices that may be potentially denied from accessing the management interface 322.

At 604, instructions 312 may query the host manager device 326 for a candidate list of host devices using the received credentials. In some examples, the query may indicate to the host manager device 326 to provide a candidate list of host devices that already have access to the data interface 320 of the system 300. In response to the query, the host manager device 326 may provide the registry 334 containing the candidate list of host devices having access to the data interface 322. In some examples, the host manager device 326 may provide a registry 334 containing one or more candidate list(s) of host devices that have access to the management interface and/or the data interface of the system 300.

At 606, instructions 314 may select a second set of host devices from the candidate list of host devices. The second set of host devices may include the host device(s) that are to be denied access to the management interface 322 of the system 300. In the example where the administrator provides the credentials of candidate host devices, instructions 314 may select a second set of host devices from the candidate host devices. In some examples, instructions 314 may select the second set of host devices from the candidate list based on input provided by a storage administrator. In some examples, instructions 314 may identify one or more host device(s) from the candidate list that have access to a data interface 320. Instructions 314 may include such host device(s) in the second set of host devices. In some examples, instructions 314 may identify one or more host device(s) among all the host devices coupled to the system 300 that have access to the data interface 320 and include such host devices in the second set of host devices. For example, the host device 324-2 has access to the data interface (as shown by the arrow 390 in FIG. 3). In such examples, instructions 314 may include the host device 324-2 in the second set of host devices.

At 608, instructions 316 may obtain network adapter information associated with each host device of the second set of host devices from the host manager device. For example, instructions 316 may send a request for network adapter information of the host devices in the second set of host devices to the host manager device 326. In some examples, in response to the request, the host manager device 326 may provide the network adapter information stored in a memory resource of the host manager device 326 or retrieve the latest network adapter information from the respective management controllers of the host devices of the second set of host devices in real-time. The host manager device 326 may provide the retrieved network adapter information of such host devices to the system 300. In some examples, instructions 316 may obtain the network adapter information from the respective host devices (e.g., via an API).

At 610, instructions 316 may create a deny-list containing network adapter information associated with each host device of the second set of host devices. The deny-list may be stored in the persistent repository 323 of system 300, for example. In some examples, instructions 316 may add the obtained network adapter information to an existing deny-list in the persistent repository 323. For example, instructions 316 may obtain updated network adapter information from the host manager device 326 (e.g., when network adapter information is retrieved by the host manager device in real-time). In some examples, instructions 316 may determine whether the network adapter information includes a digital certificate before creating the deny-list or adding the network adapter information to an existing deny-list. The digital certificate may be issued by a trusted certificate authority to authenticate an identity of the network adapter or a host device and to verify integrity of the network adapter information of the host device. Instructions 316 may authenticate and verify by checking whether the digital certificate includes a digital signature from the trusted certificate authority, for example. FIG. 6B depicts an example deny-list 614 including example entries 616, 618, 620. Entry 616 includes network adapter information (NAI) 332-2 corresponding to host device 324-2, entry 618 includes NAI-332-13, and entry 620 includes NAI-332-18 corresponding to host devices among the host device 324-1 to 324-P. Although a single deny-list and three entries are depicted, instructions may create multiple deny-lists, each having a plurality of entries.

At 612, instructions 316 may configure the management interface to deny connections from host devices associated with network adapter information in the deny-list. For example, in response to receiving a request to access the management interface 322 from a host device, instructions 316 may determine whether the network adapter information of that host device is indicated in the deny-list. If network adapter information is indicated in the deny-list, instructions 316 may deny access to the management interface 322. For example, the host device 324-2 may be denied access to the management interface 322 (as depicted by the arrow 370 in FIG. 3) as network adapter information 332-2 is indicated in the deny-list 614.

In some examples, instructions 316 may create both allow-list and deny-list as described in relation to FIGS. 5A, 5B, 6A, and 6B. Instructions 316 may configure the management interface 322 to allow or deny connections from the host devices based on whether their network adapter information is indicated in the allow-list or deny-list.

Figure 7A:
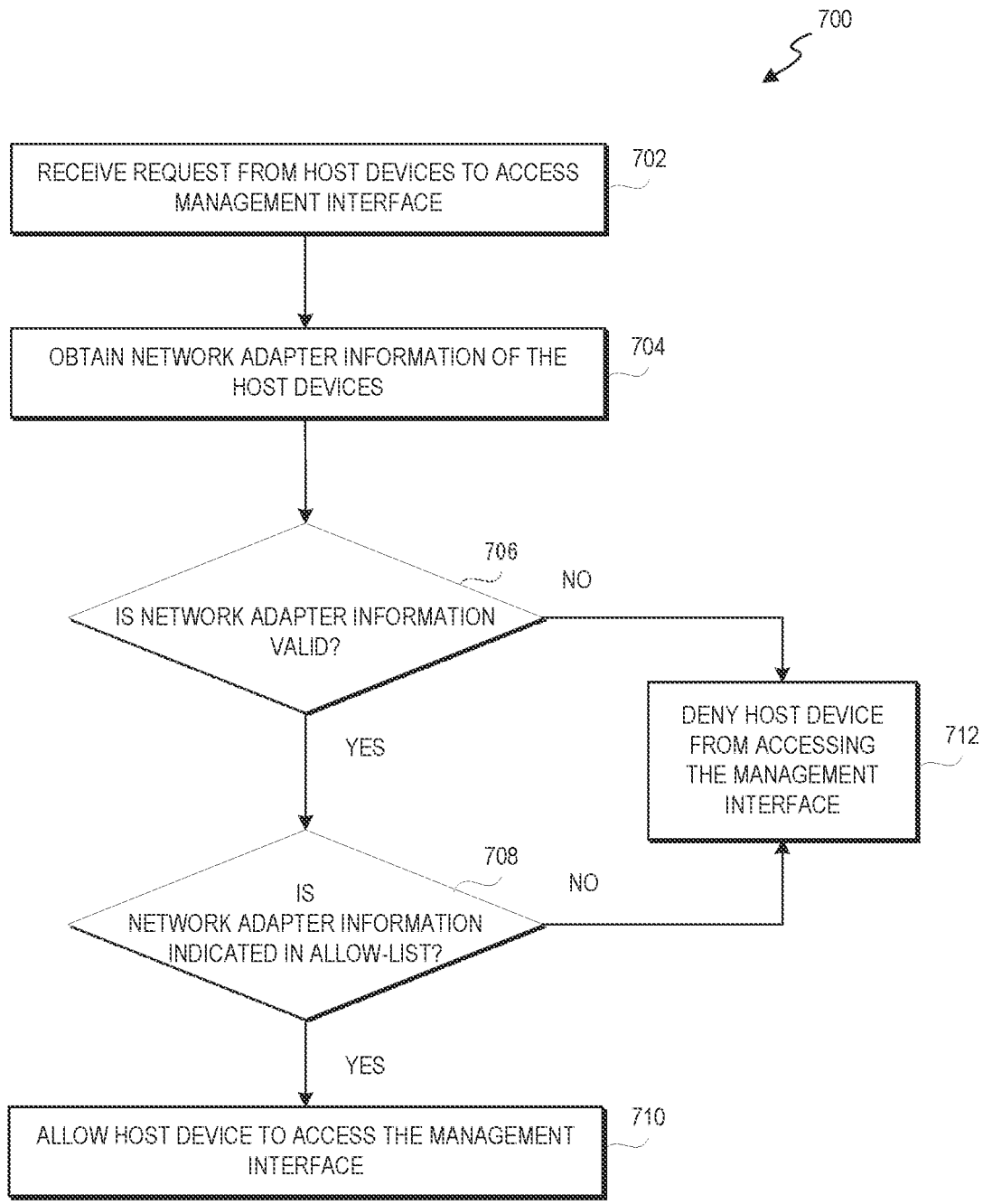
FIG. 7A is a flowchart of an example method to allow connections from host devices.
Figure 7B:
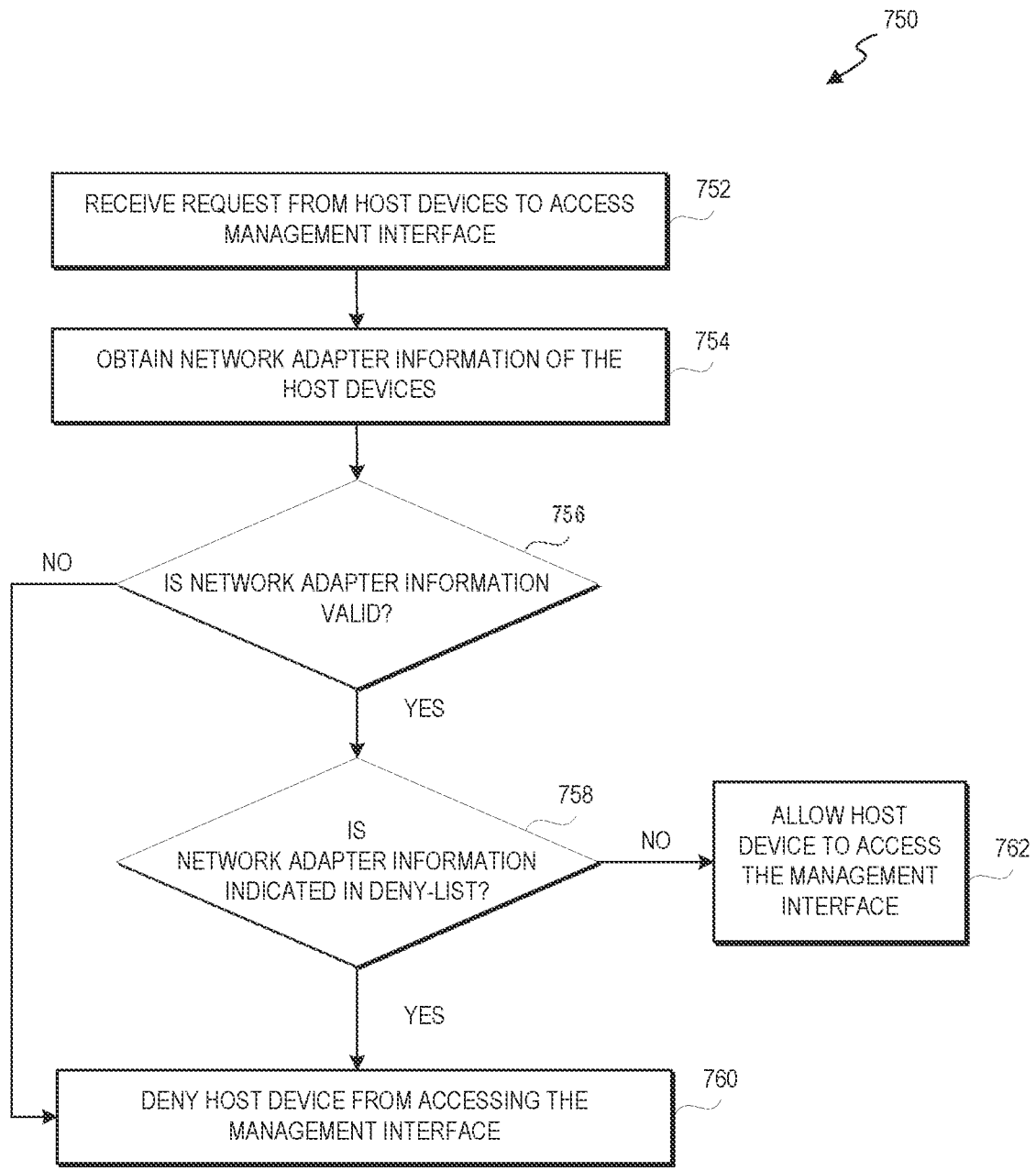
FIG. 7B is a flowchart of an example method to deny connections from host devices.
Figure 7C:
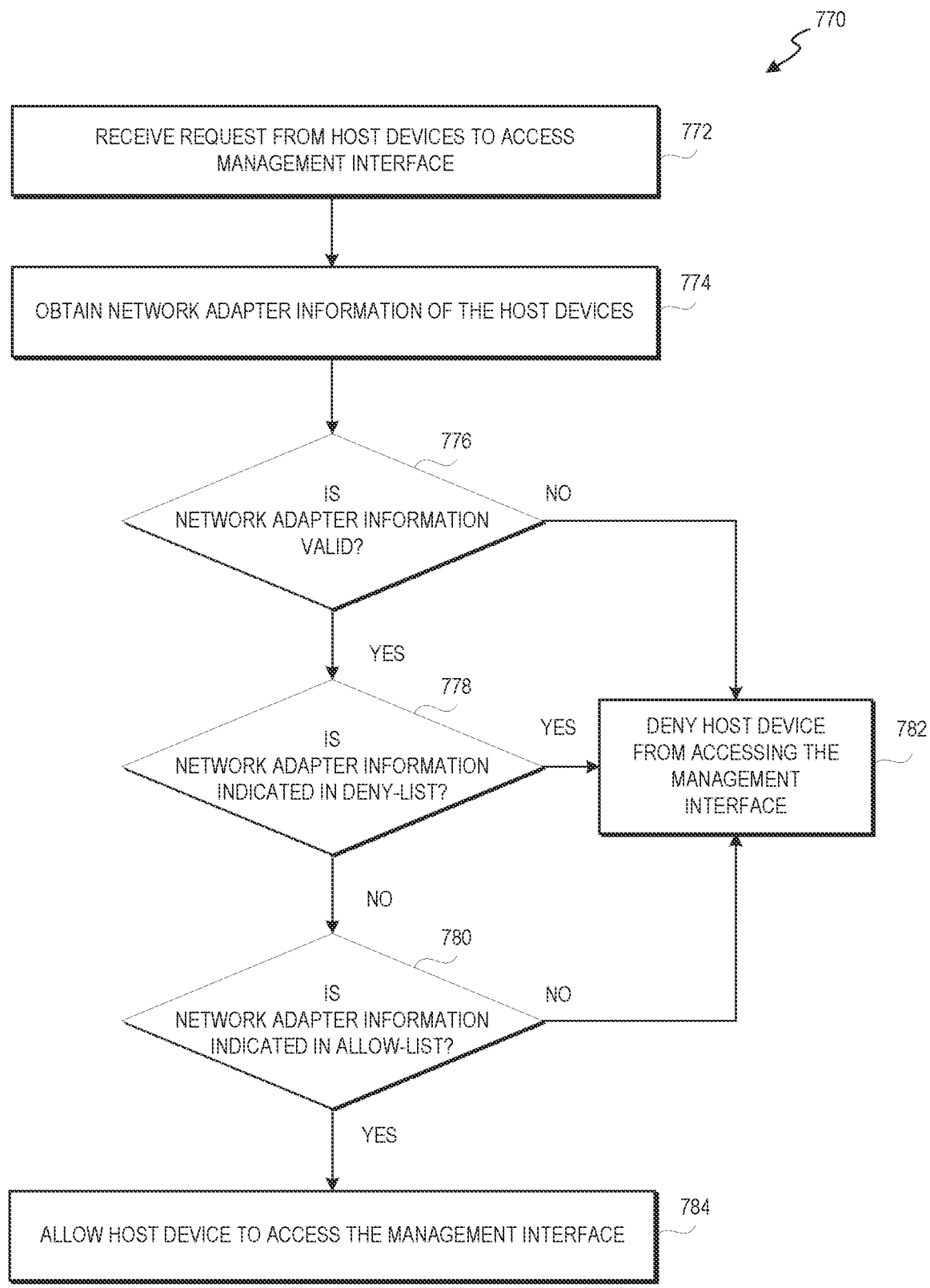
FIG. 7C is a flowchart of an example method to allow or deny connections from host devices.

Example methods are described herein in relation to FIGS. 7A, 7B, and 7C. Although the example methods are described with the example implementations of FIGS. 3 and 4, other example implementations (e.g., FIGS. 1 and 2) may also be used for implementing the example methods. FIG. 7A is a flowchart of an example method 700 to allow connections from host devices. As described in relation to FIGS. 3, 4, 5A, 5B, 6A, and 6B, the system 300 is configured with network adapter information of host devices that are allowed or denied access to the management interface 322. At 702 of method 700, instructions 311 may receive a request from a host device among the host devices 324-1 to 324-P to access the management interface 322 of the system 300. For example, instructions 311 may receive the request from host devices 324-1, 324-2, and 324-3.

At 704, instructions 311 may obtain network adapter information of the host device from the host device or the host manager device 326. In some examples, the request received from the host device 324-1, 324-2, 324-3 may include the network adapter information 332-1, 332-2, 332-3. In some examples, instructions 311 may send a request for the network adapter information of the host devices 324-1, 324-2, 324-3 to the host devices or the host manager device 326. In response, instructions 311 may receive the requested network adapter information 332-1, 332-2, 332-3 from the host manager device 326 or directly from the host devices 324-1, 324-2, 324-3.

At 706, instructions 311 may determine whether the network adapter information 332-1, 332-2, 332-3 is valid or not. In some examples, instructions 311 may determine whether the network adapter information 332-1, 332-2, 332-3 includes a respective digital certificate (e.g., issued from a trusted certificate authority) to verify identities of the host devices 324-1, 324-2, 324-3 and to validate the network adapter information 332-1, 332-2, 332-3. In response to determining that the network adapter information of a host device does not include a digital certificate ("NO" at 706), method 700 may proceed to 712. For example, if a host device (compromised by malware) attempts to gain access to the management interface 322 by providing spoofed network adapter information to the system 300, then instructions 311 may determine that the spoofed network adapter information does not include a digital certificate. In some examples, instructions 311 may determine that the spoofed network adapter information includes an invalid digital certificate. In such examples, the digital certificate may be expired or may include a digital signature from an untrusted certificate authority. In some examples, the digital certificate may be invalid as it may be included in a certificate revocation list (CRL), which includes a list of certificates that have been revoked by a certificate authority. In some examples, instructions 311 may also decrypt encrypted network adapter information (e.g., the encrypted hash value of hardware, firmware, software information of the network adapter) and compare the decrypted hash value and the hash value of the hardware, firmware, software information. In response to a mismatch between the decrypted hash value and the hash value of hardware, firmware, software information, instructions 311 may determine that the network adapter information is invalid, and method 700 may proceed to 712. At 712, instructions 311 may deny the host device from accessing the management interface.

In response to determining that the network adapter information of a host device includes a valid digital certificate ("YES" at 706), method 700 may proceed to 708. For example, the instructions 311 may determine that the digital certificate is valid if the digital certificate includes a digital signature from a trusted certificate authority. In some examples, instructions 311 may also determine that the network adapter information is valid in response to a match between the decrypted hash value and the hash value of hardware, firmware, software information, of the network adapter of the host device. Upon a successful validation, method 700 may proceed to 708.

At 708, instructions 311 may determine whether the network adapter information is indicated in the allow-list stored in the persistent repository 323 of the system 300. Instructions 311 may determine by performing a look-up operation in the allow-list to find a match for the network adapter information. For example, instructions 311 may determine whether the network adapter information 332-1, 332-2, 332-3 is included in the allow-list. In response to determining that the network adapter information 332-1 is indicated in the allow-list ("YES" at 706), at 710, instructions 311 may allow the host device 324-1 to access the management interface 322. In response to determining that the network adapter information 332-2, 332-3 is not indicated in the allow-list ("NO" at 708), at 710, instructions 311 may deny the host devices 324-2, 324-3 from accessing the management interface 322.

FIG. 7B is a flowchart of an example method 750 to deny connections from host devices. At 752 of method 750, instructions 311 may receive a request from a host device among the host devices 324-1 to 324-P to access the management interface 322 of the system 300. For example, instructions 311 may receive the request from the host devices 324-1, 324-2, 324-3. At 754, instructions 311 may obtain network adapter information of the host devices. In some examples, the request received from the host device 324-1, 324-2, 324-3 may include the network adapter information 332-1, 332-2, 332-3.

At 756, instructions 311 may determine whether the network adapter information 332-1, 332-2, 332-3 is valid or not. In some examples, instructions 311 may determine whether the network adapter information 332-1, 332-2, 332-3 includes a respective digital certificate (e.g., issued from a trusted certificate authority) to verify the identities of the host devices 324-1, 324-2, 324-3 and to validate the network adapter information 332-1, 332-2, 332-3. In response to determining that the network adapter information of a host device does not include a digital certificate ("NO" at 756), method 750 may proceed to 760. For example, if a host device (compromised by malware) attempts to gain access to the management interface 322 by providing spoofed network adapter information to the system 300, then instructions 311 may determine that the spoofed network adapter information does not include a digital certificate. In some examples, instructions 311 may determine that the spoofed network adapter information includes an invalid digital certificate. In such examples, the digital certificate may be expired or may include a digital signature from an untrusted certificate authority. In some examples, the digital certificate may be invalid as it may be included in a certificate revocation list (CRL). In some examples, instructions 311 may also decrypt encrypted network adapter information (e.g., the encrypted hash value of hardware, firmware, software information of the network adapter) and compare the decrypted hash value and the hash value of the hardware, firmware, software information. In response to a mismatch between the decrypted hash value and the hash value of hardware, firmware, software information, instructions 311 may determine that the network adapter information is invalid, and method 750 may proceed to 760. At 760, instructions 311 may deny the host device from accessing the management interface. In response to determining that the network adapter information of a host device includes a valid digital certificate from a trusted certificate authority and a match between the decrypted hash value and the hash value of hardware, firmware, software information, of the network adapter of the host device ("YES" at 756), method 750 may proceed to 758.

At 758, instructions 311 may determine whether the network adapter information is indicated in the deny-list stored in the persistent repository 323 of the system 300. Instructions 311 may determine by performing a look-up operation in the deny-list to find a match for the network adapter information. For example, instructions 311 may determine whether the network adapter information 332-1, 332-2, 332-3 is included in the deny-list. In response to determining that the network adapter information 332-2 is indicated in the deny-list ("YES" at 758), method 750 may proceed to 760. At 760, instructions 311 may deny the host device 324-2 from accessing the management interface 322. At 758, in response to determining that the network adapter information 332-1 and 332-3 is not indicated in the deny-list ("NO" at 758), method 750 may proceed to 762. At 762, instructions 311 may allow the host device 324-1 and 324-3 to access the management interface 322.

In some examples, the system 300 may be capable of allowing and denying host devices by implementing the methods 700 and 750. For example, in response to receiving a request from a host device to access the management interface 322, instructions 311 may determine whether network adapter information of the host device is indicated in the deny-list or allow-list. Based on the determination, instructions 311 may allow or deny the host device to access the management interface 322.

Examples will now be described herein in relation to FIGS. 3, 4, and 7C. FIG. 7C is a flowchart of an example method 770 to allow or deny connections from host devices. At 772 of method 770, instructions 311 may receive a request from a host device among the host devices 324-1 to 324-P to access the management interface 322 of the system 300. For example, instructions 311 may receive the request from host devices 324-1, 324-2, and 324-3.

At 774, instructions 311 may obtain network adapter information of the host device. In some examples, the request received from the host device 324-1, 324-2, 324-3 may include the network adapter information 332-1, 332-2, 332-3. In some examples, instructions 311 may send a request for the network adapter information of the host devices 324-1, 324-2, 324-3 to the host devices or the host manager device 326. In response, instructions 311 may receive the requested network adapter information 332-1, 332-2, 332-3.

At 776, instructions 311 may determine whether the network adapter information 332-1, 332-2, 332-3 is valid or not. In some examples, instructions 311 may determine whether the network adapter information 332-1, 332-2, 332-3 includes a respective digital certificate (e.g., issued from a trusted certificate authority) to verify the identities of the host devices 324-1, 324-2, 324-3 and to validate the network adapter information 332-1, 332-2, 332-3. In response to determining that the network adapter information of a host device does not include a digital certificate ("NO" at 776), method 770 may proceed to 782. For example, if a host device (compromised by malware) attempts to gain access to the management interface 322 by providing spoofed network adapter information to the system 300, then instructions 311 may determine that the spoofed network adapter information does not include a digital certificate. In some examples, instructions 311 may determine that the spoofed network adapter information includes an invalid digital certificate. In such examples, the digital certificate may be expired or may include a digital signature from an untrusted certificate authority. In some examples, the digital certificate may be invalid as it may be included in a certificate revocation list (CRL). In some examples, instructions 311 may also decrypt encrypted network adapter information (e.g., the encrypted hash value of hardware, firmware, software information of the network adapter) and compare the decrypted hash value and the hash value of the hardware, firmware, software information. In response to a mismatch between the decrypted hash value and the hash value of hardware, firmware, software information, instructions 311 may determine that the network adapter information is invalid, and method 770 may proceed to 782. At 782, instructions 311 may deny the host device from accessing the management interface. In response to determining that the network adapter information of a host device includes a valid digital certificate from a trusted certificate authority and a match between the decrypted hash value and the hash value of hardware, firmware, software information, of the network adapter of the host device ("YES" at 776), method 770 may proceed to 778.

At 778, instructions 311 may determine whether the network adapter information is indicated in the deny-list stored in the persistent repository 323 of the system 300. Instructions 311 may determine by performing a look-up operation in the deny-list to find a match for the network adapter information. For example, instructions 311 may determine whether the network adapter information 332-1, 332-2, 332-3 is included in the deny-list. In response to determining that the network adapter information 332-2 is indicated in the deny-list ("YES" at 778), at 782, instructions 311 may deny the host device 324-2 from accessing the management interface 322.

Continuing with the above example, in response to determining that the network adapter information 332-1, 332-2 is not indicated in the deny-list ("NO" at 778), method 770 may proceed to 780. At 780, instructions 311 may determine whether the network adapter information is indicated in the allow-list. In response to determining that the network adapter information 332-3 is not indicated in the allow-list ("NO" at 780), method 770 may proceed to 782. At 782, instructions 311 may deny the host device 324-3 from accessing the management interface 322. At 780, in response to determining that the network adapter information 332-1 is indicated in the allow-list ("YES" at block 780), method 770 may proceed to 784. At 784, instructions 311 may allow the host device 324-1 to access the management interface 322.

In some examples, instructions 311 may allow or deny connections from the host device after performing the method steps 778 and 780, i.e., system 300 may check both the allow-list and deny-list before allowing or denying connections from the host device. For example, in response to determining that network adapter information of a host device is indicated in both the allow-list and deny-list, then instructions 311 may deny connections from that host device. In some examples, instructions 311 may interchangeably perform the method steps 778 and 780. For example, the system 300 may first determine whether the obtained network adapter information is indicated in the allow-list and then determine whether the network adapter information is indicated in the deny-list before allowing or denying connections from the host device.

Examples will now be described herein in relation to FIGS. 3, 8A, and 8B. In the example of FIG. 3, the host manager device 326 may monitor a status of the host devices 324-1 to 324-P based on information including hardware information, firmware information, or the like, obtained from the management controller of each of the host devices 324-1 to 324-P. For example, the management controller at each of the host devices 324-1 to 324-P may track the network adapter information (among other types of information) of that host device. In some examples, a management controller of a host device may detect a change in network adapter information of the host device. The change in network adapter information may be due to a replacement of hardware components like network interface card, Ethernet interface, etc., for example. In response to a change in the network adapter information of the host device, the management controller may send a trigger or an alert to the system 300 (either directly or via the host manager device 326). The host manager device 326 may obtain changes in the network adapter information associated with the host device. In some examples, the host manager device 326 may use a polling process (e.g., simple network management protocol (SNMP) request) to obtain changes in the network adapter information from one or more of the host device(s) 324-1 to 324-P periodically.

In some examples, a host device may obtain a digital certificate from a trusted certificate authority. The digital certificate may be used for verifying the integrity of changes to network adapter information of the host device, for example. In some examples, the host device may provide identity information (e.g., Internet Protocol (IP) address) and the changes to the network adapter information (e.g., hardware, software, firmware information, or the like) of that host device to the certificate authority. The certificate authority may determine whether the identity information is valid (e.g., via standard validation techniques). Upon successful validation, the certificate authority may issue a digital certificate that includes a digital signature from the certificate authority and the changes in the network adapter information of that host device. The digital signature may be a signed hash value of the changes in the network adapter information (e.g., encrypted using a private key of the certificate authority). The digital certificate with the digital signature may certify that the changes to the network adapter information of that host device belong to the host device.

Figure 8A:
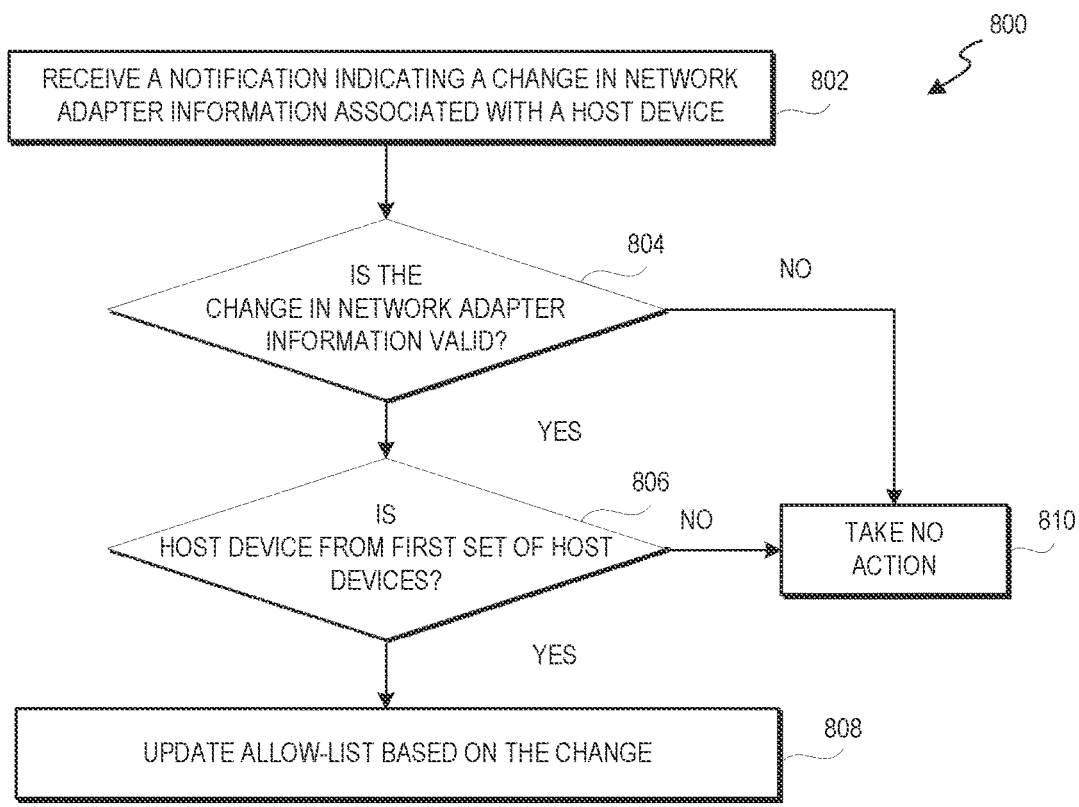
FIG. 8A is a flowchart of an example method to update an allow-list.

FIG. 8A is a flowchart of an example method 800 to update an allow-list. At 802 of method 800, instructions 311 may receive a notification indicating a change in network adapter information associated with a host device among the host devices 324-1 to 324-P. The storage system 300 may receive the notification from the host manager device 326 or directly from the host device. In the example of FIG. 3, the storage system 300 may receive a notification from the host manager device 326 or the host devices 324-1, 324-2. The notification may be received via an API and may include the changes in the respective network adapter information 332-1, 332-2 of the host devices 324-1, 324-2 and an encrypted hash value of the changes in the respective network adapter information 332-1, 332-2. In some examples, the notification may include one or more digital certificate(s), each corresponding to a respective host device 324-1, 324-2.

At 804, instructions 311 may determine whether the change in network adapter information is valid. For example, instructions 311 may check whether the digital certificate includes a digital signature from a trusted certificate authority. Instructions 311 may also generate a hash value of the changes in the network adapter information and decrypt the encrypted hash value of the changes in the network adapter information using the public key of the certificate authority. Instructions 311 may determine whether the generated hash value and the decrypted hash value match. In response to determining that the digital certificate does not include the digital signature from the trusted certificate authority, or that the generated hash value and decrypted hash value do not match, instructions may determine that the network adapter information is not valid ("NO" at 804), and method 800 may proceed to 810. At 810, instructions 311 may not perform any action. For example, if a host device (compromised by malware) attempts to gain access to the management interface 322 by providing spoofed changes in network adapter information to the system 300, then instructions 311 may determine that the spoofed changes in the network adapter information do not include a digital certificate. In some examples, instructions 311 may determine that the spoofed changes in the network adapter information include an invalid digital certificate. In such examples, the digital certificate may be expired or may include a digital signature from an untrusted certificate authority. In some examples, the digital certificate may be invalid as it may be included in a certificate revocation list (CRL).

In response to determining that the digital certificate includes the digital signature from the trusted certificate authority and that the generated hash value and decrypted hash value match ("YES" at 804), instructions 311 may successfully validate the authenticity of the corresponding host device and validate the integrity of the changes in respective network adapter information sent by the host device in the notification and proceed to 806. At 806, instructions 311 may determine whether the host device indicated in the notification belongs to the first set of host devices. For example, instructions 311 may determine whether the host device 324-1, 324-2 is included in the first set of host devices by performing a look-up operation in the persistent repository 323, which may store identities of the first set of host devices. In response to determining that the host device 324-1 is included in the first set of host devices ("YES" at 806), method 800 may proceed to 808.

At 808, instructions 311 may update the allow-list based on the change. In the example of FIG. 5B, instructions 311 may update the entry 520 including the network adapter information (NAI 332-1) associated with host device 324-1 in the allow-list 518. In some examples, updating an entry in the allow-list may include editing the entry (i.e., replacing the old network adapter information with new network adapter information) or deleting the entry. Subsequently, instructions 311 may not allow access to the management interface from host devices with the old network adapter information. At 806, in response to determining that the host device 324-2 indicated in the notification is not included in the first set of host devices ("NO" at 806), method 800 may, at 810, not perform any action. As will be appreciated, examples described above may automatically update entries in the allow-list in response to receiving notifications indicative of valid changes in network adapter information, and therefore, manual intervention (e.g., by a storage administrator) to maintain the list of host devices allowed to access the management interface 322 may be reduced.

Figure 8B:
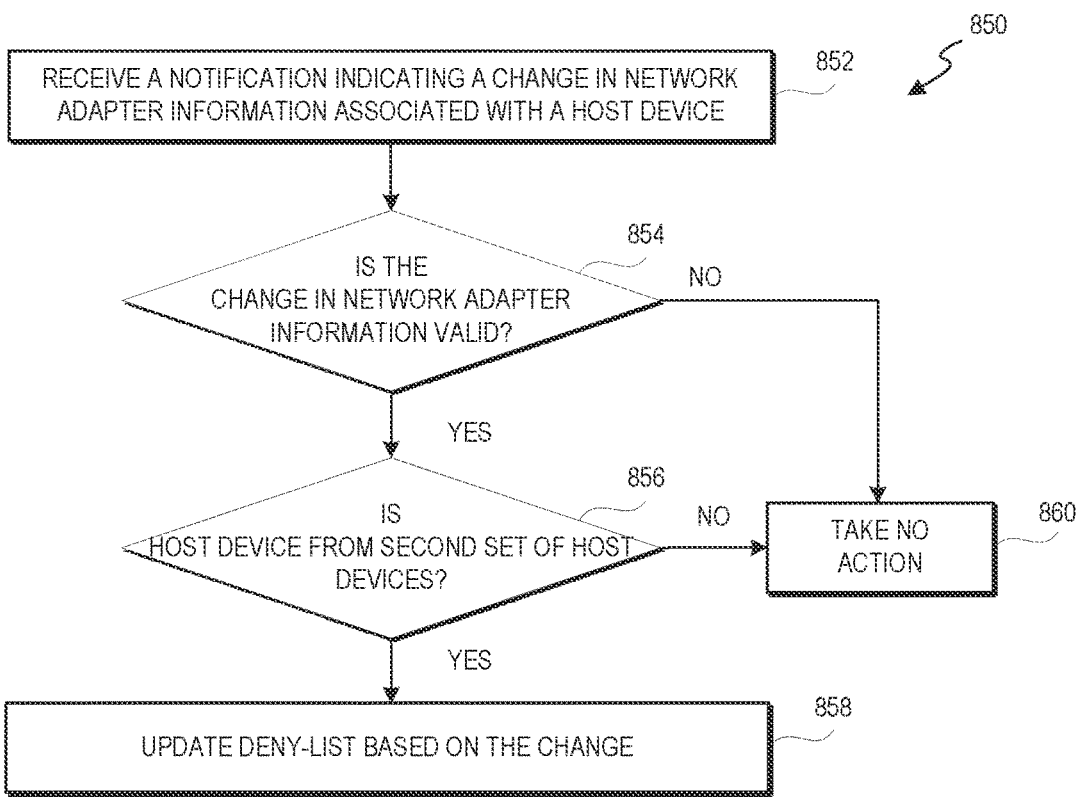
FIG. 8B is a flowchart of an example method to update a deny-list.

FIG. 8B is a flowchart of an example method 850 to update a deny-list. At 852, instructions 311 may receive a notification indicating a change in network adapter information associated with a host device among the host devices 324-1 to 324-P. In the example of FIG. 3, the storage system 300 may receive a notification from the host manager device 326 or the host device itself. The notification may include the changes in respective network adapter information 332-1, 332-2 of the host devices 324-1, 324-2 and an encrypted hash value of the changes in the respective network adapter information 332-1, 332-2. In some examples, the notification may include one or more digital certificate(s), each corresponding to a respective host device 324-1, 324-2.

At 854, instructions 311 may determine whether the change in network adapter information is valid. For example, instructions 311 may check whether the digital certificate includes a digital signature from a trusted certificate authority. Instructions 311 may also generate a hash value of the changes in the network adapter information and decrypt the encrypted hash value of the changes in the network adapter information using the public key of the certificate authority. Instructions 311 may determine whether the generated hash value and the decrypted hash value match. In response to determining that the digital certificate does not include the digital signature from the trusted certificate authority, or that the generated hash value and decrypted hash value do not match, instructions may determine that the changes in the network adapter information are not valid ("NO" at 854), and method 800 may proceed to 860. At 860, instructions 311 may not perform any action. For example, if a host device (compromised by malware) attempts to gain access to the management interface 322 by providing spoofed changes in network adapter information to the system 300, then instructions 311 may determine that the spoofed changes in the network adapter information do not include a digital certificate. In some examples, instructions 311 may determine that the spoofed changes in network adapter information include an invalid digital certificate. In such examples, the digital certificate may be expired or may include a digital signature from an untrusted certificate authority. In some examples, the digital certificate may be invalid as it may be included in a certificate revocation list (CRL).

In response to determining that the digital certificate includes the digital signature from the trusted certificate authority and that the generated hash value and decrypted hash value match ("YES" at 854), instructions 311 may successfully validate the authenticity of the corresponding host device and validate the integrity of the changes in respective network adapter information sent by the host device in the notification and proceed to 856. At 856, instructions 311 may determine whether the host device indicated in the notification belongs to the second set of host devices. For example, instructions 311 may determine whether the host device 324-1 and 324-2 are included in a second set of host devices by performing a look-up operation in the persistent repository 323, which may store identities of the second set of host devices. In response to determining that the host device 324-2 is in the second set of host devices, method may proceed to 856. In some examples, instructions 311 may also check whether the notification includes a digital certificate to verify whether the changes to the network adapter information are associated with the same host device. At 858, instructions 311 may update the deny-list based on the change. In the example of FIG. 6B, instructions 311 may update the entry 616 including the network adapter information (NAI 332-2) associated with host device 324-2 in the allow-list 614. Further, at 856, in response to determining that the host device 324-1 is not in the second set of host devices, at 860, instructions 311 may not perform any action (i.e., not update the deny-list). As will be appreciated, examples described above may automatically update entries in the deny-list in response to receiving notifications indicative of valid changes in network adapter information, and therefore, manual intervention (e.g., by a storage administrator) to maintain the list of host devices denied from accessing the management interface 322 may be reduced.

Figure 9:
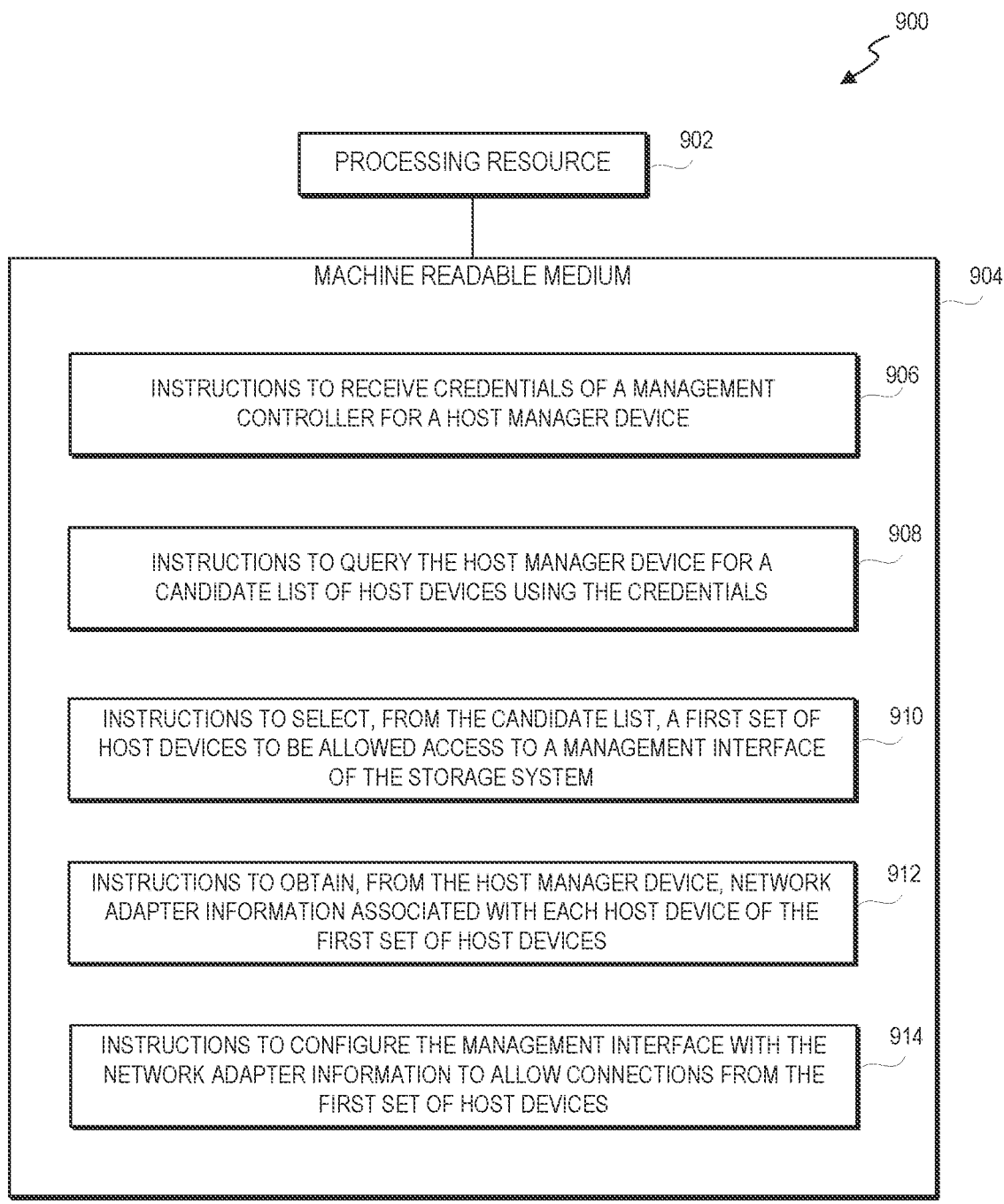
FIG. 9 is a block diagram of a processing resource and a machine-readable medium encoded with example instructions to configure management interface access in a storage system.

Moving to FIG. 9, a block diagram 900 that depicts a processing resource 902 and a machine-readable medium 904 encoded with example instructions to configure access to the management interface of a storage system, in accordance with an example. The machine-readable medium 904 may be non-transitory and is alternatively referred to as a non-transitory machine-readable medium 904. In some examples, the machine-readable medium 904 may be accessed by the processing resource 902. In some examples, the processing resource 902 may represent one example of the processing resource 108 of the storage system 100 described in relation to FIG. 1 or the processing resource 308 of the storage system 300 described in relation to FIG. 3. Further, the machine-readable medium 904 may represent one example of the machine-readable medium 110 of the storage system 100 described in relation to FIG. 1 or the machine-readable medium 310 of the storage system 300 described in relation to FIG. 3.

The machine-readable medium 904 may be any electronic, magnetic, optical, or other physical storage devices that may store data and/or executable instructions. As described in detail herein, the machine-readable medium 904 may be encoded with executable instructions 906, 908, 910, 912, and 914 (hereinafter collectively referred to as instructions 906-914) for performing the method 400 described in FIG. 4, for example. Although not shown, in some examples, the machine-readable medium 904 may be encoded with certain additional executable instructions to perform the method 400 of FIG. 4, and/or any other operations performed by the storage system 300, without limiting the scope of the present disclosure.

The processing resource 902 may be a physical device capable of retrieving and executing the instructions 906-914 stored in the machine-readable medium 904, or combinations thereof. In some examples, the processing resource 902 may fetch, decode, and execute the instructions 906-914 stored in the machine-readable medium 904 to configure access to management interface in storage systems. In certain examples, as an alternative or in addition to retrieving and executing the instructions 906-914, the processing resource 902 may include at least one IC, other control logic, other electronic circuits, or combinations thereof that include a number of electronic components for performing the functionalities intended to be performed by the system 100 of FIG. 3, for example.

The instructions 906 when executed by the processing resource 902 may cause the processing resource 902 to instructions to receive credentials of a management controller for a host manager device. In some examples, the instructions 906 may cause the processing resource 902 to receive the credentials of management controllers of candidate list of host devices, which may be a set of host devices the processing resource 902 is configured to interact with. In such examples, the instructions 906 may cause the processing resource 902 to interact directly with host devices instead of interacting with a host manager device. For example, the processing resource 902 may receive credentials for management controllers of respective host devices. The instructions 908 when executed by the processing resource 902 may cause the processing resource 902 to query the host manager device for a candidate list of host devices using the credentials. The instructions 910 when executed by the processing resource 902 may cause the processing resource 902 to select a first set of host devices from the candidate list that are to be allowed access to the management interface of the system 300. The instructions 912 when executed by the processing resource 902 may cause the processing resource 902 to obtain, from the host manager device, network adapter information associated with each host device of the first set of host devices. In some examples, the processing resource may obtain the network adapter information directly from the host devices instead of obtaining it from the host manager device. The instructions 914 when executed by the processing resource 902 may cause the processing resource 902 to configure the management interface using the network adapter information to allow connections from the first set of host devices.

In the examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In the examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In certain examples, the computing device may be or may include virtualized computing device (e.g., a virtual machine or a containerized application) executing on hardware. In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In the examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1 and 9, storage medium 110 may be implemented by one machine-readable storage medium, or multiple machine-readable storage media. Moreover, in certain examples, where the computing device may be a virtual machine or a containerized application, the processing resource and the machine-readable medium may represent a processing resource and a machine-readable medium of the hardware or a computing system that hosts the computing device as the virtual machine or the containerized application.

In the examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual object (e.g., a volume) made up of storage space from multiple different storage devices.

In some examples, the functionalities described above in relation to instructions described herein may be implemented by one or more engines which may be any combination of hardware and programming to implement the functionalities of the engine(s). In the examples described herein, such combinations of hardware and programming may be implemented in a number of different ways. For example, the programming for the engines may be processor-executable instructions stored on at least one non-transitory machine-readable storage medium, and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In the examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract, and drawings), and/or all of the elements of any method or process so disclosed, may be combined in any combination, except combinations where at least some of such features and/or elements are mutually exclusive. For example, functionalities described herein in relation to any of FIGS. 1-9 may be provided in combination with functionalities described herein in relation to any other of FIGS. 1-9.

What is claimed is:

1. A method comprising:
receiving, at a processing resource of a storage system, credentials of a management controller for each host device of a plurality of candidate host devices, the storage system comprising a management interface and a data interface, the management interface to receive a management command that configures a storage volume of the storage system, and the data interface to receive a data-access command that accesses data in the storage system;
selecting, by the processing resource, a first set of host devices from the plurality of candidate host devices, wherein each host device of the first set of host devices is to be allowed access to the management interface of the storage system, wherein the management interface is to allow management operations on the storage system and is separate from the data interface;
for each respective host device of the first set of host devices, obtaining, by the processing resource, network adapter information comprising a respective digital certificate for the respective host device from the management controller of the respective host device;
validate, by the processing resource, each respective host device of the first set of host devices using a digital signature in the respective digital certificate;
configuring, by the processing resource, the management interface with the network adapter information for each respective host device of the first set of host devices to allow connections from the respective host device to the management interface;
selecting, by the processing resource, a second set of host devices from the plurality of candidate host devices, wherein each host device of the second set of host devices is to be denied access to the management interface of the storage system, and wherein the second set of host devices is different from the first set of host devices;
for each corresponding host device of the second set of host devices, obtaining, by the processing resource, network adapter information for the corresponding host device from the management controller of the corresponding host device; and
configuring, by the processing resource, the management interface with the network adapter information for each corresponding host device of the second set of host devices to deny connections from the corresponding host device to the management interface.

2. The method of claim 1, further comprising:
preventing, by the processing resource, a host device from the first set of host devices from accessing the management interface in response to determining that the host device has access to the data interface of the storage system.

3. The method of claim 1, wherein the configuring of the management interface with the network adapter information for each respective host device of the first set of host devices comprises:
creating, by the processing resource, an allow-list containing the network adapter information for each respective host device of the first set of host devices.

4. The method of claim 3, further comprising:
receiving, by the processing resource, a request to access the management interface from a first host device; and
allowing, by the processing resource, the first host device to access the management interface in response to determining that the network adapter information for the first host device is indicated in the allow-list.

5. The method of claim 1, wherein the selecting, from the plurality of candidate host devices, of the second set of host devices comprises:
identifying a first host device that has access to the data interface of the storage system; and
including the first host device in the second set of host devices.

6. The method of claim 5, wherein the configuring of the management interface with the network adapter information for each host device of the second set of host devices comprises:
creating, by the processing resource, a deny-list containing the network adapter information for each host device of the second set of host devices.

7. The method of claim 6, further comprising:
receiving, by the processing resource, a request to access the management interface from a first host device; and
denying, by the processing resource, the first host device from accessing the management interface in response to determining that the network adapter information for the first host device is included in the deny-list.

8. A non-transitory machine-readable storage medium comprising instructions executable by a processing resource of a storage system to:
select, from a plurality of candidate host devices, a first set of host devices to be allowed access to a management interface of the storage system, wherein the management interface is to receive a management command that configures a storage volume of the storage system, and the management interface is separate from a data interface of the storage system, the data interface to receive a data-access command that accesses data in the storage system;
for each respective host device of the first set of host devices, obtain network adapter information comprising a respective digital certificate of the respective host device;
validate each respective host device of the first set of host devices using a digital signature in the respective digital certificate;
configure the management interface with the network adapter information of each respective host device of the first set of host devices to allow connections from the respective host device to the management interface;
select, from the plurality of candidate host devices, a second set of host devices to be denied access to the management interface of the storage system, wherein each host device of the second set of host devices is different from each host device of the first set of host devices;
for each corresponding host device of the second set of host devices, obtain network adapter information of the corresponding host device; and
configure the management interface with the network adapter information of each corresponding host device of the second set of host devices to deny connections from the corresponding host device to the management interface.

9. The non-transitory machine-readable storage medium of claim 8, wherein the configuring of the management interface with the network adapter information of each respective host device of the first set of host devices comprises:

creating an allow-list containing the network adapter information of each respective host device of the first set of host devices.

10. The non-transitory machine-readable storage medium of claim 9, comprising instructions executable by the processing resource to:

receive, from a first host device, a request to access the management interface; and in response to determining that the network adapter information of the first host device is indicated in the allow-list, allow the first host device to access the management interface.

11. The non-transitory machine-readable storage medium of claim 8, wherein the instructions to select the second set of host devices comprise instructions executable by the processing resource to:

identify a first host device that has access to the data interface of the storage system; and include the first host device in the second set of host devices.

12. The non-transitory machine-readable storage medium of claim 8, wherein the configuring of the management interface with the network adapter information of each host device of the second set of host devices comprises:

creating a deny-list containing the network adapter information of each host device of the second set of host devices.

13. The non-transitory machine-readable storage medium of claim 8, wherein the digital signature in the respective digital certificate is based on encrypting, using a private key, a hash value of information comprising a network address of the respective host device.

14. The non-transitory machine-readable storage medium of claim 8, wherein the network adapter information of the respective host device comprises information of a network adapter of the respective host device.

15. The non-transitory machine-readable storage medium of claim 8, comprising instructions executable by the processing resource to:

receive, from a first host device, a notification indicating a change in the network adapter information of the first host device.

16. A storage system comprising:

a management interface to receive a management command that configures a storage volume of the storage system;

a data interface to receive a data-access command that accesses data in the storage system, wherein the management interface is separate from the data interface;

a processing resource; and a machine-readable storage medium comprising instructions executable by the processing resource to:

select a first set of host devices from a plurality of candidate host devices, wherein each host device of the first set of host devices is to be allowed access to the management interface;

for each respective host device of the first set of host devices, obtain network adapter information comprising a respective digital certificate of the respective host device from a management controller of the respective host device;

validate each respective host device of the first set of host devices using a digital signature in the respective digital certificate;

configure the management interface with the network adapter information of each respective host device of the first set of host devices to allow connections from the respective host device to the management interface;

select, from the plurality of candidate host devices, a second set of host devices to be denied access to the management interface of the storage system, wherein each host device of the second set of host devices is different from each host device of the first set of host devices;

for each corresponding host device of the second set of host devices, obtain network adapter information of the corresponding host device; and configure the management interface with the network adapter information of each corresponding host device of the second set of host devices to deny connections from the corresponding host device to the management interface.

17. The storage system of claim 16, wherein the network adapter information further includes one or more of vendor information, model information, hardware information, or firmware information.

* * * * *